(12) United States Patent
Liddell et al.

(10) Patent No.: US 11,107,466 B2
(45) Date of Patent: *Aug. 31, 2021

(54) DIGITAL ASSISTANT VOICE INPUT INTEGRATION

(71) Applicant: Microsoft Technology Licensing, LLC, Redmond, WA (US)

(72) Inventors: Derek Liddell, Kent, WA (US); Francis Zhou, Redmond, WA (US); Cheng-Yi Yen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/173,837

(22) Filed: Oct. 29, 2018

(65) Prior Publication Data
US 2019/0066685 A1 Feb. 28, 2019

Related U.S. Application Data

(62) Division of application No. 14/572,184, filed on Dec. 16, 2014, now Pat. No. 10,147,421.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 13/033* (2013.01); *G10L 15/24* (2013.01);
(Continued)

(58) Field of Classification Search
CPC .......... G10L 15/22; G10L 15/24; G10L 15/26
See application file for complete search history.

(56) References Cited

U.S. PATENT DOCUMENTS 6,466,654 B1 * 10/2002 Cooper ............... G10L 13/00
379/88.01
7,685,561 B2 3/2010 Deem et al.
(Continued)

FOREIGN PATENT DOCUMENTS

CN 102132309 A 7/2011
CN 102651104 A 8/2012
(Continued)

OTHER PUBLICATIONS

"Building Cross Platform Applications Overview", Retrieved from: https://developer.xamarin.com/guides/cross-platform/application_fundamentals/building_cross_platform_applications/part_0_-_overview/, Retrieved Date: Jul. 12, 2014, 3 Pages.
(Continued)

*Primary Examiner* — Samuel G Neway
(74) *Attorney, Agent, or Firm* — Mark K. Young; Mayer & Williams, PC

(57) ABSTRACT

A digital assistant supported on devices such as smartphones, tablets, personal computers, game consoles, etc. includes an extensibility client that exposes an interface and service that enables third party applications to be integrated with the digital assistant so the application user experiences are rendered using the native voice of the digital assistant. Specific voice inputs associated with a given application may be registered by developers using a manifest that is loaded when the application is launched on the device so that voice inputs from the device user can be mapped by the digital assistant extensibility client to the appropriate application as input events for consumption. In typical implementations, the manifest is arranged as a declarative document that streamlines application development and provides a seamless user experience by enabling customization of third party applications to integrate the digital assistant's
(Continued)

voice and behaviors within the user experience of the application's domain.

12 Claims, 18 Drawing Sheets

(51) Int. Cl.
   *G10L 15/26* (2006.01)
   *G10L 15/24* (2013.01)
   *G10L 13/033* (2013.01)

(52) U.S. Cl.
   CPC ........ *G10L 15/26* (2013.01); *G10L 2015/223* (2013.01); *G10L 2015/227* (2013.01); *G10L 2015/228* (2013.01)

(56) References Cited

U.S. PATENT DOCUMENTS

| | | | |
|---|---|---|---|
| 8,099,472 B2 | 1/2012 | Mahaffey et al. | |
| 8,270,606 B2 | 9/2012 | Caskey et al. | |
| 8,291,490 B1 | 10/2012 | Ahmed et al. | |
| 8,650,320 B1 | 2/2014 | Merrick et al. | |
| 8,667,514 B2 | 3/2014 | Rastogi et al. | |
| 8,745,573 B2 | 6/2014 | Ben-artzi et al. | |
| 8,768,711 B2* | 7/2014 | Ativanichayaphong | 704/275 |
| 8,881,179 B2 | 11/2014 | Prish et al. | |
| 9,003,431 B2 | 4/2015 | You et al. | |
| 2003/0018700 A1 | 1/2003 | Giroti et al. | |
| 2004/0006476 A1* | 1/2004 | Chiu | H04M 3/4938 704/270.1 |
| 2005/0243019 A1 | 11/2005 | Fuller et al. | |
| 2008/0160956 A1 | 7/2008 | Jackson et al. | |
| 2009/0077248 A1 | 3/2009 | Castellucci et al. | |
| 2009/0125955 A1 | 5/2009 | Delorme | |
| 2010/0061534 A1 | 3/2010 | Wang et al. | |
| 2010/0198730 A1 | 8/2010 | Ahmed et al. | |
| 2011/0035220 A1* | 2/2011 | Opaluch | G10L 15/265 704/246 |
| 2011/0035742 A1 | 2/2011 | Shenfield et al. | |
| 2011/0041090 A1 | 2/2011 | Seolas et al. | |
| 2011/0319056 A1 | 12/2011 | Toy et al. | |
| 2012/0144407 A1 | 6/2012 | Hacigumus et al. | |
| 2012/0159388 A1 | 6/2012 | Chalouhi et al. | |
| 2013/0042193 A1* | 2/2013 | Cai | G06F 30/13 715/771 |
| 2013/0055285 A1 | 2/2013 | Merry et al. | |
| 2013/0073366 A1 | 3/2013 | Heath et al. | |
| 2013/0073387 A1 | 3/2013 | Heath | |
| 2013/0086155 A1 | 4/2013 | Thomas et al. | |
| 2013/0125145 A1 | 5/2013 | Balmori Labra et al. | |
| 2013/0152070 A1 | 6/2013 | Bhullar et al. | |
| 2013/0152092 A1 | 6/2013 | Yadgar | |
| 2013/0159377 A1* | 6/2013 | Nash | H04L 67/00 709/202 |
| 2013/0254139 A1* | 9/2013 | Lei | G06N 20/00 706/11 |
| 2013/0311997 A1* | 11/2013 | Gruber | G06F 9/4843 718/102 |
| 2014/0053126 A1 | 2/2014 | Watson et al. | |
| 2014/0081633 A1 | 3/2014 | Badaskar et al. | |
| 2014/0082501 A1 | 3/2014 | Bae et al. | |
| 2014/0163976 A1 | 6/2014 | Park et al. | |
| 2014/0164400 A1* | 6/2014 | Kruglick | G06F 16/374 707/749 |
| 2014/0173448 A1 | 6/2014 | Aly et al. | |
| 2014/0214429 A1* | 7/2014 | Pantel | G10L 15/32 704/275 |
| 2014/0240363 A1 | 8/2014 | Hong et al. | |
| 2014/0244712 A1* | 8/2014 | Walters | H04L 67/10 709/202 |
| 2014/0280292 A1 | 9/2014 | Skinder | |
| 2014/0331317 A1 | 11/2014 | Singh et al. | |
| 2014/0365399 A1 | 12/2014 | Dennelly et al. | |
| 2015/0142704 A1* | 5/2015 | London | G06N 5/022 706/11 |
| 2015/0222664 A1 | 8/2015 | Battre et al. | |
| 2015/0281869 A1 | 10/2015 | Ramachandran et al. | |
| 2016/0012350 A1 | 1/2016 | Raghunathan et al. | |
| 2016/0164881 A1* | 6/2016 | Bankowski | H04W 4/70 726/4 |
| 2016/0171980 A1* | 6/2016 | Liddell | G10L 15/22 704/275 |
| 2016/0335138 A1* | 11/2016 | Surti | G06F 9/44526 |
| 2018/0068109 A1 | 3/2018 | Surti et al. | |
| 2019/0042334 A1 | 2/2019 | Surti et al. | |

FOREIGN PATENT DOCUMENTS

| | | |
|---|---|---|
| CN | 104335234 A | 2/2015 |
| JP | 2013517566 A | 5/2013 |

OTHER PUBLICATIONS

"Guile", Retrieved from: https://web.archive.org/web/20120302045325/http://www.gnu.org/software/guile, Feb. 22, 2012, 2 Pages.

"Handling Common Scenarios", Retrieved from: https://developer.apple.com/library/ios/documentation/General/Conceptual/ExtensibilityPG/ExtensionScenarios.html, Sep. 17, 2014, 7 Pages.

"Message Passing", Retrieved from: https://developer.chrome.com/extensions/messaging, Feb. 28, 2014, 10 Pages.

"Personal assistant Android app Friday learns your habits, makes recommendations", Retrieved from: http://articles.courant.com/2012-08-11/business/hc-ls-android-friday-app-20120811_1_android-app-third-party-developers, Aug. 11, 2012, 1 Page.

"Final Office Action Issued in U.S. Appl. No. 14/712,364", dated Sep. 23, 2016, 25 Pages.

"Final Office Action Issued in U.S. Appl. No. 14/712,364", dated Oct. 19, 2017, 36 Pages.

"Non Final Office Action Issued in U.S. Appl. No. 14/712,364", dated Mar. 17, 2016, 21 Pages.

"Non Final Office Action Issued in U.S. Appl. No. 14/712,364", dated Mar. 24, 2017, 27 Pages.

"Notice of Allowance Issued in U.S. Appl. No. 14/712,364", dated Jul. 13, 2018, 12 Pages.

"Final Office Action Issued in U.S. Appl. No. 16/158,825", dated Nov. 1, 2019, 22 Pages.

"Final Office Action Issued in U.S. Appl. No. 16/158,825", dated Oct. 21, 2020, 28 Pages.

"Non Final Office Action Issued in U.S. Appl. No. 16/158,825", dated Apr. 18, 2019, 18 Pages.

"Non Final Office Action Issued in U.S. Appl. No. 16/158,825", dated Apr. 6, 2020, 23 Pages.

"Office Action Issued in European Patent Application No. 16720960.0", dated Aug. 1, 2019, 5 Pages.

"Extended European Search Report Issued in European Patent Application No. 19206531.6", dated Jun. 22, 2020, 16 Pages.

"Office Action Issued in Australian Patent Application No. 2016262345", dated Sep. 9, 2020, 5 Pages.

"First Office Action and Search Report Issued in Chinese Patent Application No. 201680027982.0", dated Dec. 30, 2019, 21 Pages.

"Second Office Action Issued in Chinese Patent Application No. 201680027982.0", dated Oct. 21, 2020, 16 Pages.

"Office Action Issued in Chile Patent Application No. 2017/02831", dated Nov. 14, 2018, 8 Pages.

"Office Action Issued in Japanese Patent Application No. 2017559087", dated Nov. 11, 2019, 4 Pages.

Beaton, et al., "Eclipse Platform Technical Overview", In White Paper of International Business Machines Corp., Jul. 17, 2001, pp. 1-17.

Biancuzzo, Marty, "Hate Daily Chores? Get These Apps", Retrieved from: https://web.archive.org/web/20140620050453/http://www.wallstreetdaily.com/2014/06/19/instacart-postmates-apps/, Jun. 19, 2014, 10 Pages.

Chambers, et al., "Integrating your application into the Windows Phone Speech and Natural Language Experience", Retrieved from: https://channel9.msdn.com/Events/Build/2014/2-530, Apr. 2, 2014, 64 Pages.

(56) References Cited

OTHER PUBLICATIONS

David, "Meet your new Personal Assistant: Speaktoit (Mobile App)", Retrieved from: https://web.archive.org/web/20140706140355/http://7labs.heypub.com/mobile/meet-your-new-personal-assistant-speaktoit-mobile-app.html, Retrieved Date: Sep. 26, 2014, 6 Pages.

Doran, et al., "Cortana Extensibility in Universal Windows Apps", Retrieved from: https://channel9.msdn.com/Events/Build/2015/2-691, Apr. 30, 2015, 42 Pages.

Edwards, Luke, "Windows Phone 8.1 brings Cortana smart assistant to the world of Siri and Google Now", Retrieved from: https://web.archive.org/web/20140405150403/http://www.pocket-lint.com/news/128243-windows-phone-8-1-brings-cortana-smart-assistant-to-the-world-of-siri-and-google-now, Apr. 2, 2014, 8 Pages.

Ethertington, Darrell, "Apple Working on More Third-Party Integrations for Siri With iWatch in Mind, Report Claims", Retrieved from: https://techcrunch.com/2014/03/05/apple-working-on-more-third-party-integrations-for-siri-with-iwatch-in-mind-report-claims/, Mar. 5, 2014, 4 Pages.

McCrasken, Harry, "EasilyDo 3.0: A Do-Everything Personal Assistant for Your Smartphone", Retrieved from http://techland.time.com/2014/02/13/easilydo-3-0-a-do-everything-personal-assistant-for-your-smartphone/, Feb. 13, 2014, 2 Pages.

Milhorat, et al., "Building the Next Generation of Personal Digital Assistants", In Proceedings of 1st International Conference on Advanced Technologies for Signal and Image Processing (ATSIP), Mar. 17, 2014, pp. 458-463.

"Office Action Issued in Colombian Patent Application No. NC2017/0011488", dated Nov. 10, 2017, 4 Pages.

"Second Written Opinion Issued in PCT Application No. PCT/US2016/027653", dated Mar. 23, 2017, 9 Pages.

"International Search Report & Written Opinion Issued in PCT Application No. PCT/US2016/027653", dated Jun. 22, 2016, 17 Pages.

"Sherpa Beta Personal Assistant", Retrieved from: https://play.google.com/store/apps/details?id=com.sherpa.asistentesherpa&hl=en, Aug. 5, 2014, 2 Pages.

Viticci, Federico, "iOS 8 Extensions: Apple's Plan for a Powerful App Ecosystem", Retrieved from: https://www.macstories.net/stories/ios-8-extensions-apples-plan-for-a-powerful-app-ecosystem/, Jun. 6, 2014, 21 Pages.

"Notice of Allowance Issued in Japanese Patent Application No. 2017559087", dated Feb. 13, 2020, 5 Pages.

"How to Use Google Now on Desktop PC Using Chrome", Retrieved from: http://www.avoiderrors.net/google-now-desktop-pc/, Retrieved Date: Sep. 26, 2014, 3 Pages.

Levy, Steven, "Siri's Inventors Are Building a Radical New AI That Does Anything You Ask", Retrieved from: https://www.wired.com/2014/08/viv/, Aug. 12, 2014, 8 Pages.

"Notice of Allowance Issued in U.S. Appl. No. 16/158,825", dated May 13, 2021, 11 Pages.

"Office Action Issued in Indian Patent Application No. 201747036193", dated Jun. 11, 2021, 9 Pages.

\* cited by examiner

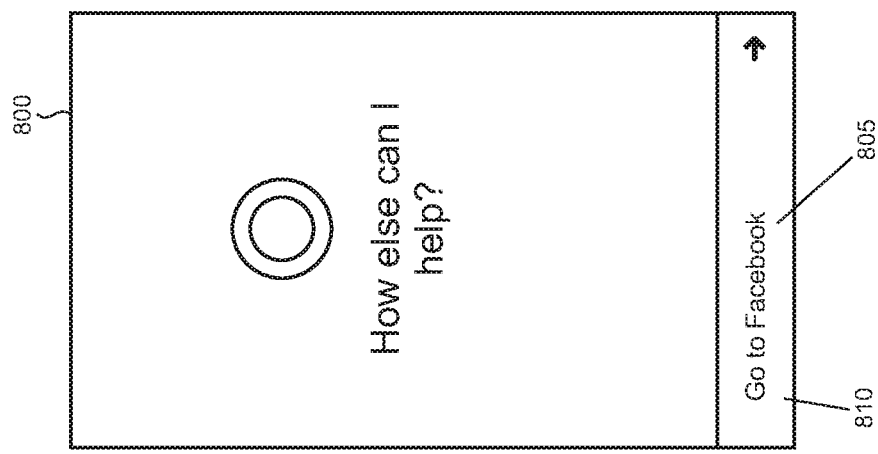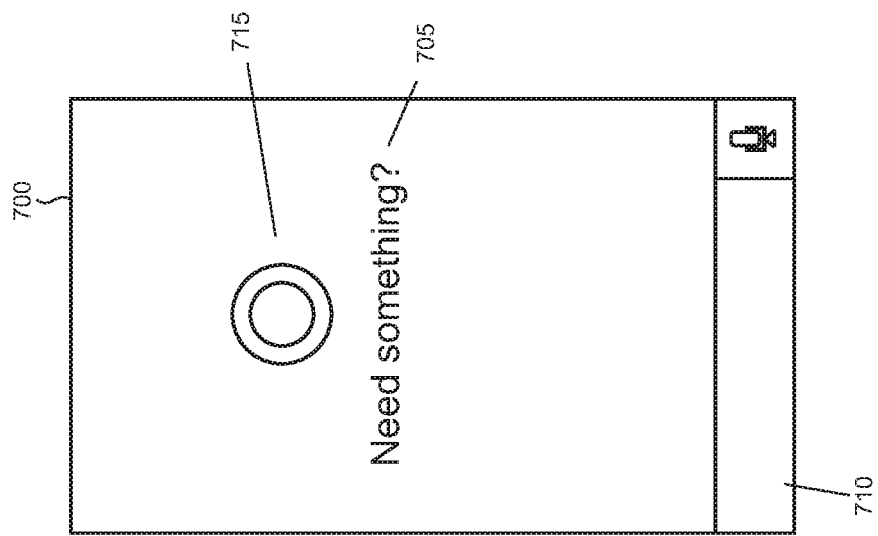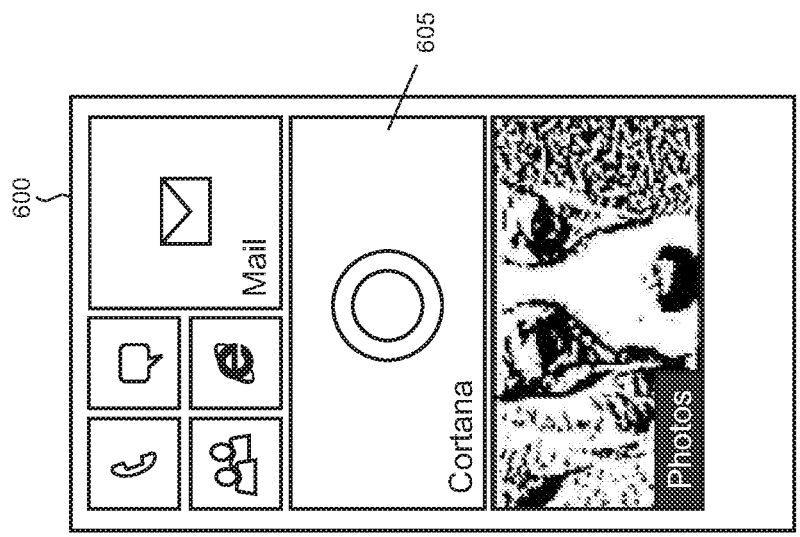

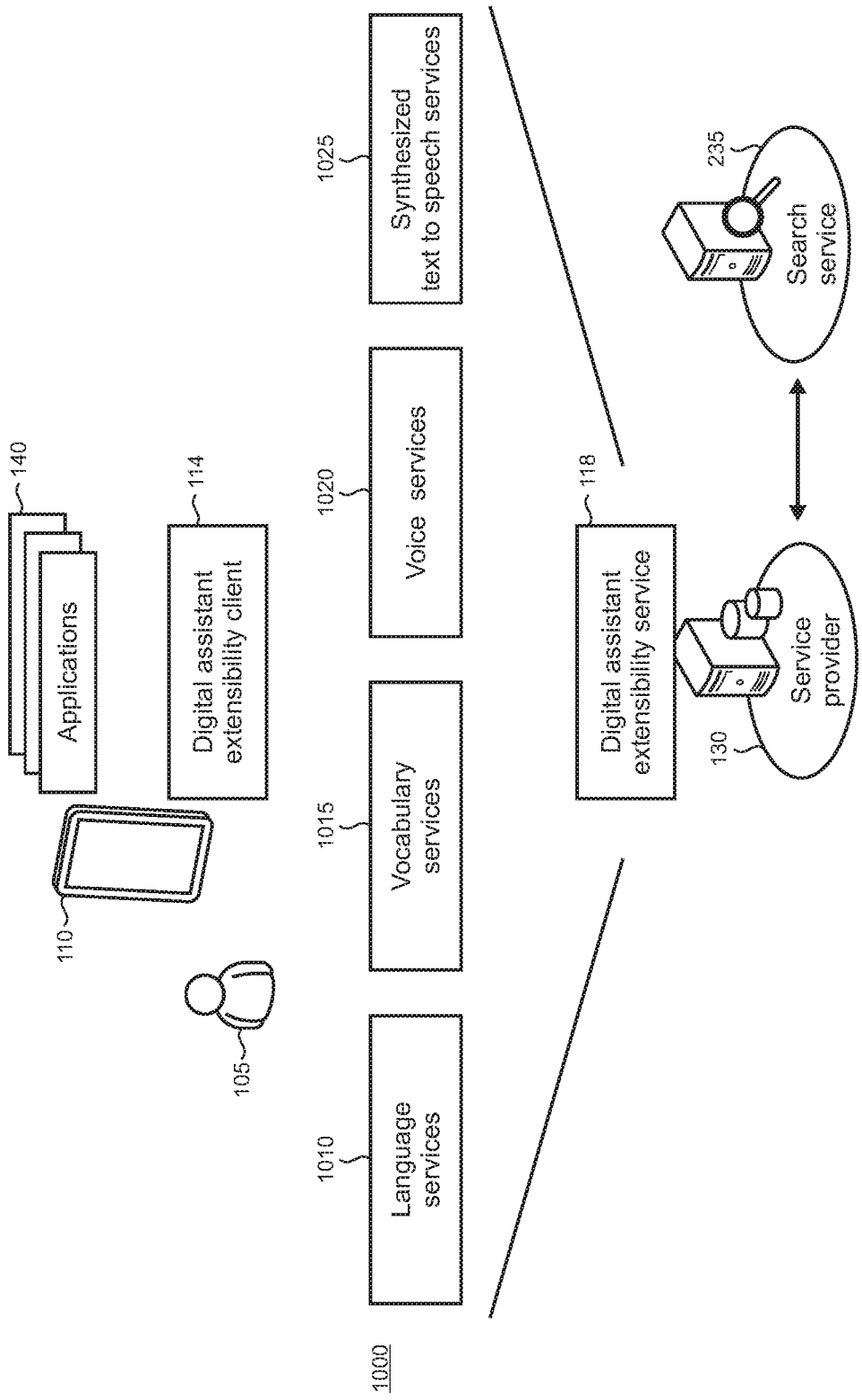

DIGITAL ASSISTANT VOICE INPUT INTEGRATION

CROSS REFERENCE TO RELATED APPLICATION

This application is a divisional of U.S. patent application Ser. No. 14/572,184, filed Dec. 16, 2014, entitled, "Digital Assistant Voice Input Integration", the contents of which are incorporated by reference in its entirety.

BACKGROUND

Digital assistants can provide a variety of features for device users and can make it easier to interact with devices to perform tasks, get information, and stay connected with friends and colleagues using voice interactions. Typically, the user can interact with the digital assistant using voice inputs, and the digital assistant can speak to the user using its own voice. Current features perform in a satisfactory manner for many use scenarios, but increased functionality can make digital assistants even more beneficial and productive.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A digital assistant supported on devices such as smartphones, tablets, personal computers (PCs), game consoles, etc. includes an extensibility client that exposes an interface and service that enables third party applications to be integrated with the digital assistant so the application user experiences are rendered using the native voice of the digital assistant. Specific voice inputs associated with a given application may be registered by developers using a manifest that is loaded when the application is launched on the device so that voice inputs from the device user can be mapped by the digital assistant extensibility client to the appropriate application as input events for consumption. In typical implementations, the manifest is arranged as a declarative document that streamlines application development and provides a seamless user experience by enabling customization of third party applications to integrate the digital assistant's voice and behaviors within the user experience of the application's domain.

Applications that register for digital assistant interoperability can opt in to a variety of services, such as language, vocabulary, voice, and text to speech services from a remote or cloud-based service provider that interfaces with the local extensibility client. Registered applications can access and utilize general digital assistant functions, data structures, and libraries exposed by the services when rendering their user experiences as well as implement application domain-specific context and behaviors using the programming features captured in the declarative manifest. For example, applications can parse chunks of text and have it read by the digital assistant using its native voice.

In addition to supporting a streamlined and compact digital assistant development environment, the present digital assistant voice input integration can improve user efficiency and performance when interacting with a device. For example, by rendering user experiences in a unified manner in a single voice, disruptions in transitions among applications are reduced or eliminated which reduces distractions for the user. In addition, voice intelligibility and comprehension is improved for applications using the present extensibility of the digital assistant as users can typically select voice, language, and accent preferences that are optimally suited to their particular needs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 6, 7, and 8 show screen captures of illustrative user interfaces (UIs) exposed by a digital assistant;

FIG. 10 shows illustrative services exposed by a digital assistant extensibility service;

Figure 1:
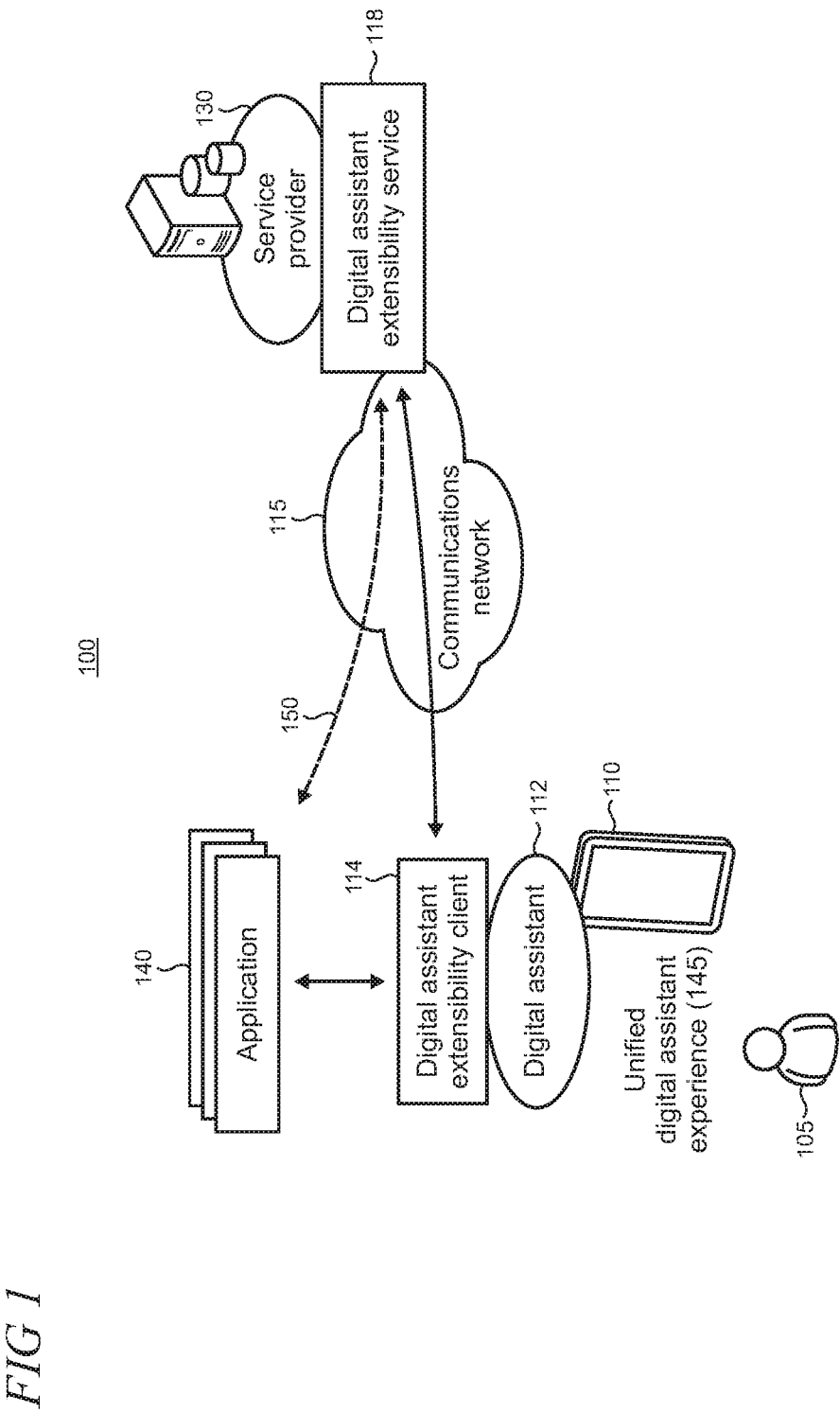
FIG. 1 shows an illustrative unified digital assistant experience surfaced to a user by a digital assistant which includes an extensibility client that exposes an interface and service to third party applications.

Like reference numerals indicate like elements in the drawings. Elements are not drawn to scale unless otherwise indicated. It is emphasized that the particular UIs displayed in the drawings can vary from what is shown according to the needs of a particular implementation. While UIs are shown in portrait mode in the drawings, the present arrangement may also be implemented using a landscape mode.

DETAILED DESCRIPTION

FIG. 1 shows an overview of a digital assistant voice input integration arrangement 100 in which a device 110 hosts a digital assistant 112. The digital assistant 112 supports an extensibility client 114 that typically interoperates over a communications network 115 with an extensibility service 118 supported by a remote service provider 130. The digital assistant extensibility client 114 is configured to enable interaction with applications 140 to provide a unified experience to a user 105 across the applications using the native digital assistant voice, as indicated by reference numeral 145. The term "unified experience" as used here means that the user experiences supported by both applications 140 and the digital assistant 112 have a similar and consistent sound, look, and feel in most cases and utilize the same voice so that transitions between the applications and the digital assistant are handled smoothly and the experiences are rendered seamlessly to the user.

The applications 140 can be third party applications in some cases in which the application authors, developers, or providers are entities that are not the same as the provider of the digital assistant 112. First party applications can also be supported in some implementations of digital assistant voice input integration. In some cases, the digital assistant extensibility service 118 may support direct interaction with the applications 140, as indicated by line 150 in FIG. 1.

Figure 2:
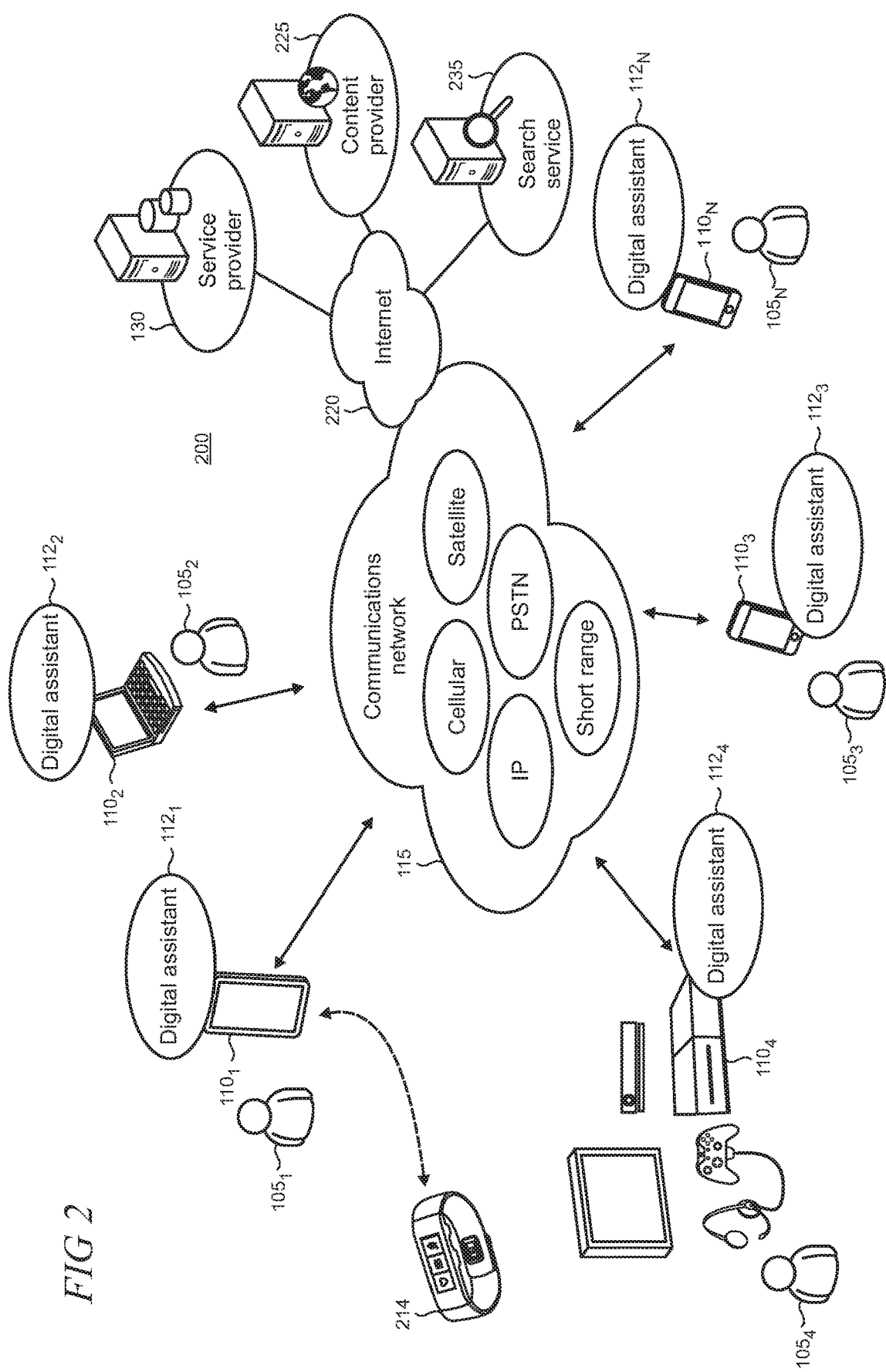
FIG. 2 shows an illustrative computing environment in which devices can communicate and interact over a network.

Various details of illustrative implementations of digital assistant voice input integration are now presented. FIG. 2 shows an illustrative environment 200 in which various users 105 employ respective devices 110 that communicate over the communications network 115. Each device 110 includes an instance of the digital assistant 112. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, devices that use headsets and earphones (e.g., Bluetooth-compatible devices), phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 200 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access the communications network 115 in order to implement various user experiences. The communications network can include any of a variety of network types and network infrastructure in various combinations or sub-combinations including cellular networks, satellite networks, IP (Internet-Protocol) networks such as Wi-Fi and Ethernet networks, a public switched telephone network (PSTN), and/or short range networks such as Bluetooth® networks. The network infrastructure can be supported, for example, by mobile operators, enterprises, Internet service providers (ISPs), telephone service providers, data service providers, and the like. The communications network 115 typically includes interfaces that support a connection to the Internet 220 so that the mobile devices 110 can access content provided by one or more content providers 225 and also access the service provider 130 in some cases. Accordingly, the communications network 115 is typically enabled to support various types of device-to-device communications including over-the-top communications, and communications that do not utilize conventional telephone numbers in order to provide connectivity between parties.

Accessory devices 214, such as wristbands and other wearable devices may also be present in the environment 200. Such accessory device 214 typically is adapted to interoperate with a device 110 using a short range communication protocol like Bluetooth to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110.

Figure 3:
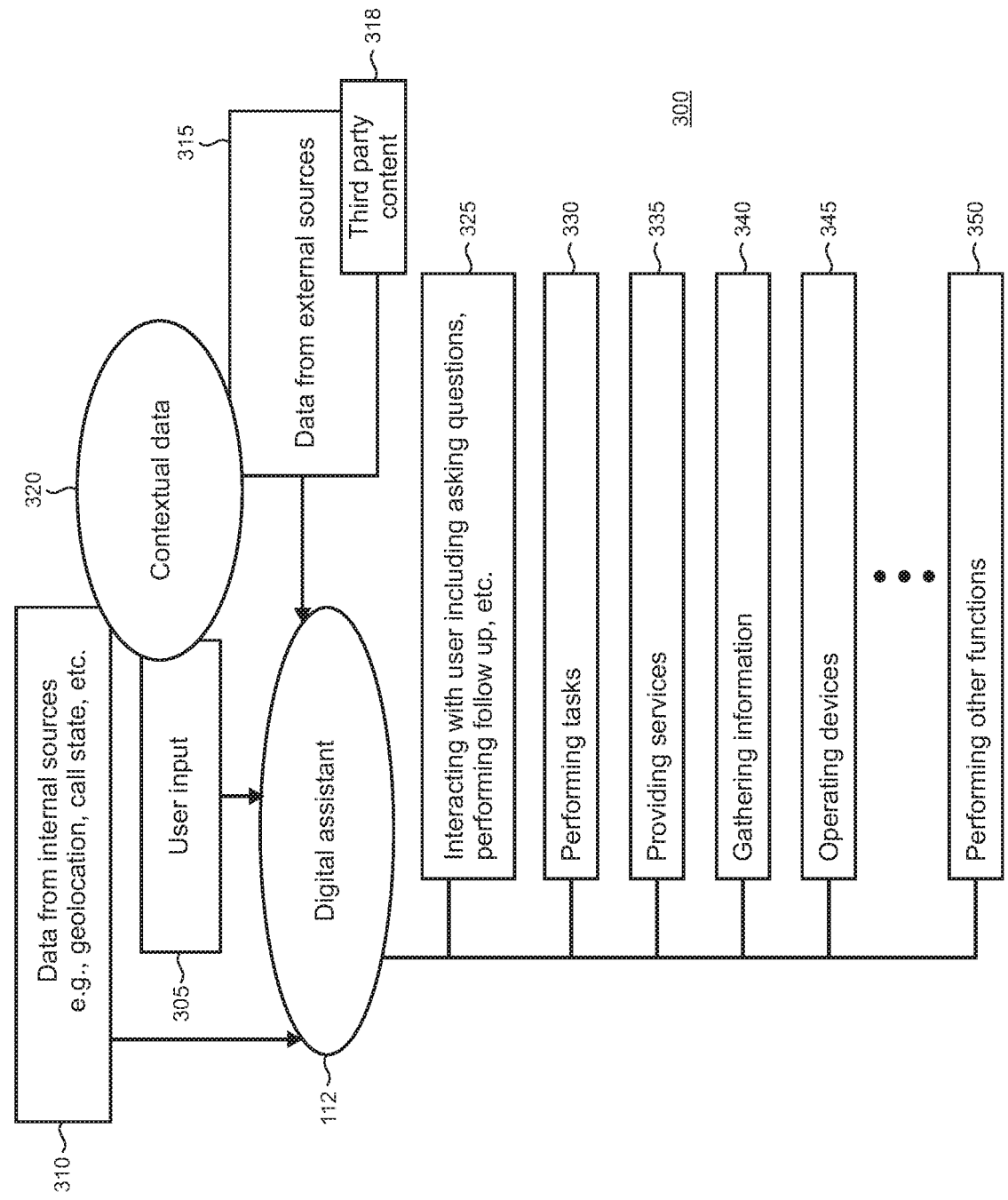
FIG. 3 shows illustrative inputs to a digital assistant and an illustrative taxonomy of general functions that may be performed by a digital assistant.

FIG. 3 shows an illustrative taxonomy of functions 300 that may typically be supported by the digital assistant 112 either natively or in combination with an application 140. Inputs to the digital assistant 112 typically can include user input 305, data from internal sources 310, and data from external sources 315 which can include third-party content 318. For example, data from internal sources 310 could include the current location of the device 110 that is reported by a GPS (Global Positioning System) component on the device, or some other location-aware component. The externally sourced data 315 includes data provided, for example, by external systems, databases, services, and the like such as the service provider 130 (FIG. 1).

The various inputs can be used alone or in various combinations to enable the digital assistant 112 to utilize contextual data 320 when it operates. Contextual data can include, for example, time/date, the user's location, language, schedule, applications installed on the device, the user's preferences, the user's behaviors (in which such behaviors are monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

As shown, the functions 300 illustratively include interacting with the user 325 (through the natural language UI and other graphical UIs, for example); performing tasks 330 (e.g., making note of appointments in the user's calendar, sending messages and emails, etc.); providing services 335 (e.g., answering questions from the user, mapping directions to a destination, setting alarms, forwarding notifications, reading emails, news, blogs, etc.); gathering information 340 (e.g., finding information requested by the user about a book or movie, locating the nearest Italian restaurant, etc.); operating devices 345 (e.g., setting preferences, adjusting screen brightness, turning wireless connections such as Wi-Fi and Bluetooth on and off, communicating with other devices, controlling smart appliances, etc.); and performing various other functions 350. The list of functions 300 is not intended to be exhaustive and other functions may be provided by the digital assistant 112 and/or applications 140 as may be needed for a particular implementation of the present digital assistant voice input integration.

Figure 4:
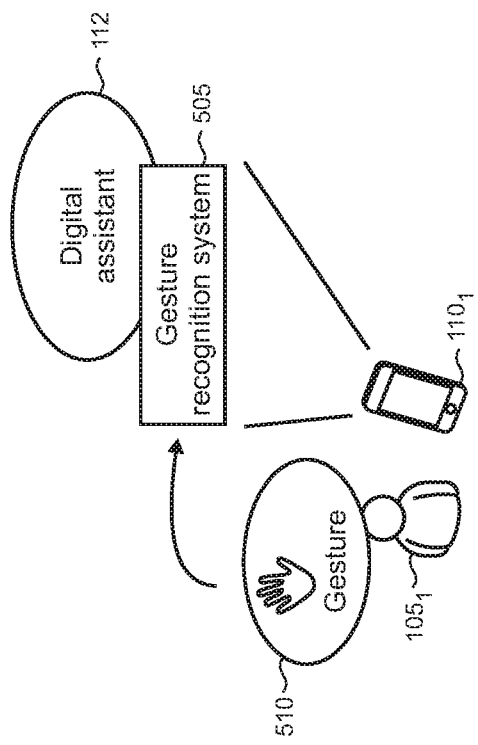
FIGS. 4 and 5 show illustrative interfaces between a user and a digital assistant.

As shown in FIG. 4, the digital assistant 112 can employ a voice recognition system 450 having a user interface (UI) that can take voice inputs 410 as inputs from the user 105. The voice inputs 410 can be used to invoke various actions, features, and functions on a device 110, provide inputs to the systems and applications, and the like. In some cases, the voice inputs 410 can be utilized on their own in support of a particular user experience while in other cases the voice input can be utilized in combination with other non-voice inputs or inputs such as those implementing physical controls on the device or virtual controls implemented on a UI or those using gestures (as described below).

Figure 5:
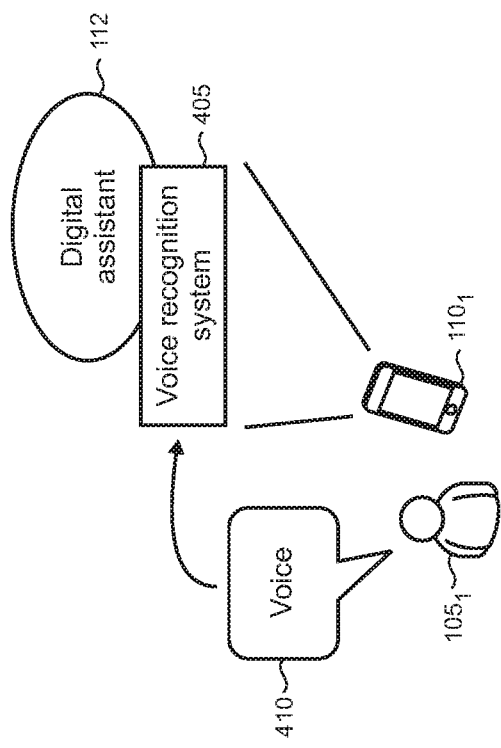

The digital assistant 112 can also employ a gesture recognition system 505 having a UI as shown in FIG. 5. Here, the system 505 can sense gestures 510 performed by the user 105 as inputs to invoke various actions, features, and functions on a device 110, provide inputs to the systems and applications, and the like. The user gestures 510 can be sensed using various techniques such as optical sensing, touch sensing, proximity sensing, and the like. In some cases, various combinations of voice commands, gestures, and physical manipulation of real or virtual controls can be utilized to interact with the digital assistant. In some scenarios, the digital assistant can be automatically invoked. For example, as the digital assistant typically maintains awareness of device state and other context, the digital assistant may be invoked by specific context such as user input, received notifications, or detected events.

The digital assistant 112 can be exposed to the user 105 through a UI that is displayed on the device 110. For example, FIGS. 6, 7, and 8 show various illustrative screen captures of UIs that may be utilized by the digital assistant. It is emphasized that the particular UIs displayed in the drawings can vary from what is shown according to the needs of a particular implementation. UI 600 in FIG. 6 shows the digital assistant (named "Cortana" in this illustrative example) represented by a tile 605 that is displayed along with tiles representing other applications or user experiences on a start screen of a device. The digital assistant may also be configured to be launched from any location within any UI on the device, or from within any current user experience. For example, the user 105 can be on a phone call, browsing the web, watching a video, or listening to music, and simultaneously launch the digital assistant from within any of those experiences. In some cases the digital assistant can be launched through manipulation of a physical or virtual user control, and/or by voice command and/or gesture in other cases.

When the user invokes the digital assistant, for example, by touching the tile 605 or by invoking a voice command (e.g., "Hey Cortana") or gesture, a UI 700 shown in FIG. 7 is displayed on the device 110 that includes a text string 705 that asks the user if something is needed. In alternative implementations, text to voice translation can be employed so that an audio message can be played in place of, or to supplement the text string 705. As shown, the UI includes a box 710 that is configured for showing a textual representation of a received voice command or other user input.

One or more graphic objects 715 can be displayed on the UI 700 to represent the digital assistant to the user. The graphic object 715 in this example is a circular shape that can be animated so that, for example, it changes its shape, color, transparency, motion, or appearance as the digital assistant performs tasks, provides information, interacts with the user, etc.

As shown in the UI 800 in FIG. 8, the user has input the string 805 "Go to Facebook" into the box 810 using, for example, keypad or voice input. In response to the input, the digital assistant can launch a third party application on the device 110 as illustratively described in the use scenarios shown in FIGS. 14 and 15 and described in the accompanying text.

Figure 9:
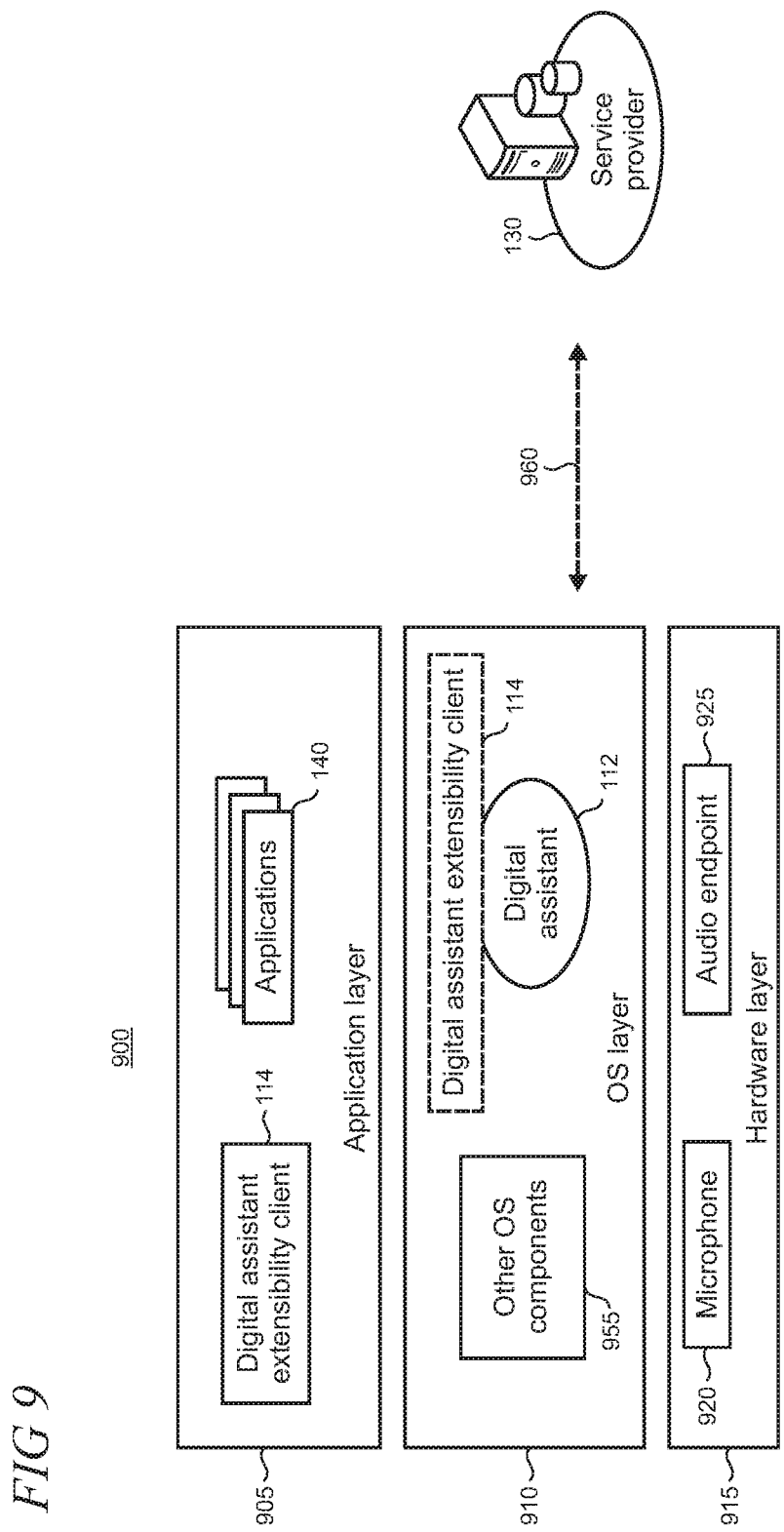
FIG. 9 shows an illustrative layered architecture that includes a digital assistant component and extensibility client.

FIG. 9 shows an illustrative layered architecture 900 that may be instantiated on a given device 110. The architecture 900 is typically implemented in software, although combinations of software, firmware, and/or hardware may also be utilized in some cases. The architecture 900 is arranged in layers and includes an application layer 905, an OS (operating system) layer 910, and a hardware layer 915. The hardware layer 915 provides an abstraction of the various hardware used by the device 110 (e.g., input and output devices, networking and radio hardware, etc.) to the layers above it. In this illustrative example, the hardware layers support a microphone 920 and an audio endpoint 925 which may include, for example, the device's internal speaker, a wired or wireless headset/earpiece, external speaker/device, and the like.

The application layer 905 in this illustrative example supports various applications 140 (e.g., web browser, map application, email application, news application, etc.), as well as the digital assistant extensibility client 114. The applications are often implemented using locally executing code. However in some cases, these applications may rely on services and/or remote code execution provided by remote servers or other computing platforms such as those supported by the service provider 130 or other cloud-based resources. While the digital assistant extensibility client 114 is shown here as a component that is instantiated in the application layer 905, it will be appreciated that the functionality provided by a given application may be implemented, in whole or part, using components that are supported in either the OS or hardware layers.

The OS layer 910 supports the digital assistant 112 and various other OS components 955. In typical implementations, the digital assistant 112 can interact with the service provider 130, as indicated by line 960. That is, the digital assistant 112 in some implementations can partially utilize or fully utilize remote code execution supported at the service provider 130, or using other remote resources. In addition, it may utilize and/or interact with the other OS components 955 (and/or other components that are instantiated in the other layers of the architecture 900) as may be needed to implement the various features and functions described herein. In some implementations, some or all of the functionalities supported by the digital assistant extensibility client 114 can be incorporated into the digital assistant as shown by the dashed rectangle in FIG. 9.

FIG. 10 shows illustrative services 1000 that may be exposed by the remote digital assistant extensibility service 118 to the applications 140. The services 1000 can be implemented and/rendered locally on the device 110 in whole or part by the extensibility client 114. Alternatively, some or all of the services may be directly provided to the applications from the extensibility service 118 in some cases using interfaces (not shown) that enable remote access. The service provider 130 may access other services from a variety of providers, such as the search service 235, as may be needed to support the provisioning of the services 1000.

The language services 1010 can support utilization of different languages by the applications when providing their unified user experiences. For example, some applications may be utilized in multi-lingual settings while other applications may have regional or global distribution that make it appealing to support multiple languages. The vocabulary services 1015 may support application utilization of specialized and/or industry-specific vocabularies. For example, technical and scientific vocabularies can be supported for an application dealing with computer and technology news. Thus, a news reading application could access the vocabulary services 1015 so that a particular term is correctly pronounced when an article is read aloud to the user 105.

The voice services 1020 may support utilization of different voices by the applications when providing their unified user experiences. The voice may include, in various implementations voices associated with human actors of different genders, ages, backgrounds, etc., and different accents may also be supported in some instances. Thus, for example, a given application may utilize different voices for different aspects of their user experience. The synthesized text to speech services 1025 may be utilized by an application in cases when a word or text object is not recognized and/or is not a member of an accessible vocabulary library. Here, a word or phrase can be artificially generated to mimic a human speaker and appropriately placed into the outgoing voice stream as the application executes.

Figure 11:
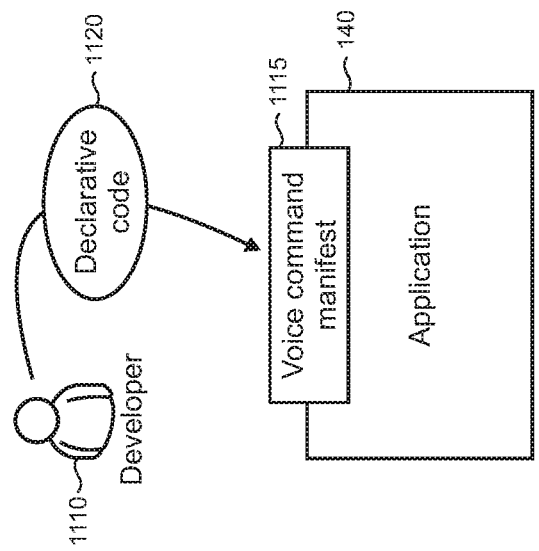
FIG. 11 shows illustrative actions by a developer to populate a voice command manifest.

The arrangement may be configured in a manner that simplifies the amount of work needed by developers to integrate applications to provide unified digital assistant user experiences. As shown in FIG. 11, during application development time (indicated by reference numeral 1105), an application developer 1110 can populate a voice command manifest 1115 that is associated with an application 140. Typically, the manifest can be populated with declarative code 1120 using XML (eXtensible Markup Language) and the like that define word commands offered by the application 140 that may be offered to the system to render a particular user experience. Scripting may also be utilized in some implementations. Alternatively, procedural code or combinations of declarative and procedural code types may be utilized. Accordingly, within the context supported by a given application domain, certain voice commands will invoke particular application behaviors. Supporting a simple declarative manifest 1115 provides the developer with an easy way to register and modify voice commands with the digital assistant.

Figure 12:
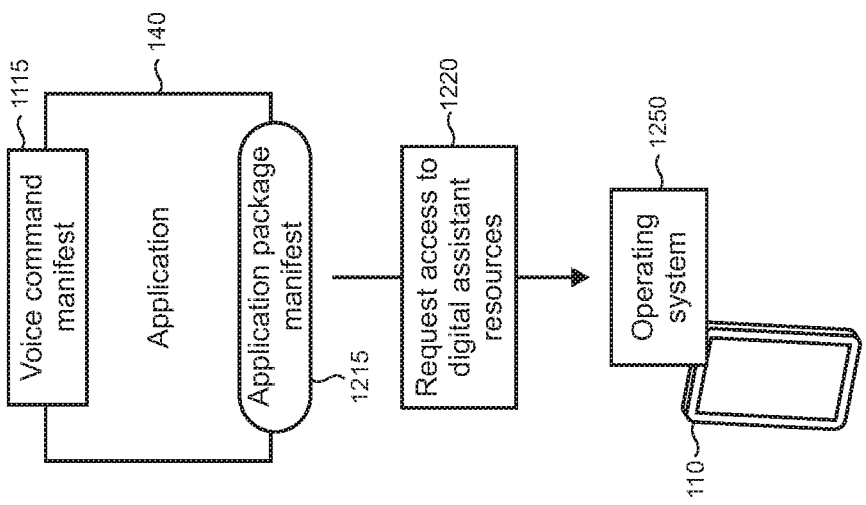
FIG. 12 shows illustrative interactions between an application and an operating system on a device during application installation.

As shown in FIG. 12, during installation of the application 140 on a device 110 (indicated by reference numeral 1205), an application package manifest 1215, or similar installation package that is utilized to validate and deploy the application, is configured to launch a request 1220 to access digital assistant resources. Typically, the request describes the extensibility points of interaction for the application, a description of capabilities and resources required, and the like to facilitate interaction between the application with the operating system 1250 and/or digital assistant components executing thereon.

Figure 13:
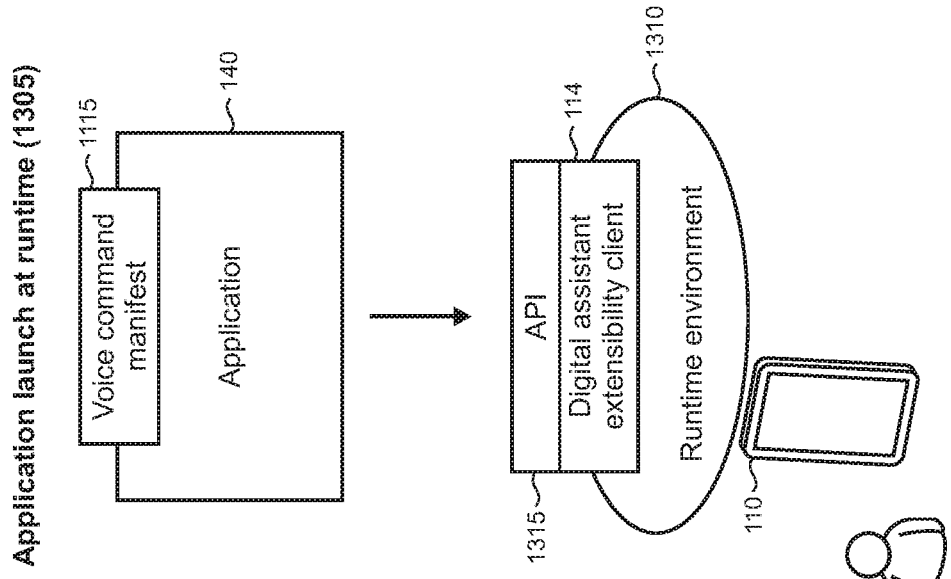
FIG. 13 shows illustrative interactions between an application and a digital assistant extensibility client during application runtime.

As shown in FIG. 13, during application launch at runtime on a device 110 (indicated by reference numeral 1305) in a runtime environment 1310, the application can load its voice command manifest 1115 through an application programming interface (API) 1315 exposed by the digital assistant extensibility client 114. During runtime, the extensibility client can listen for registered voice commands and map the commands to the appropriate application for consumption, for example, as input events. The application can thus render its unified experience using the digital assistant and accessing the related services (as shown in FIG. 10 and described in the accompanying text).

Figure 14:
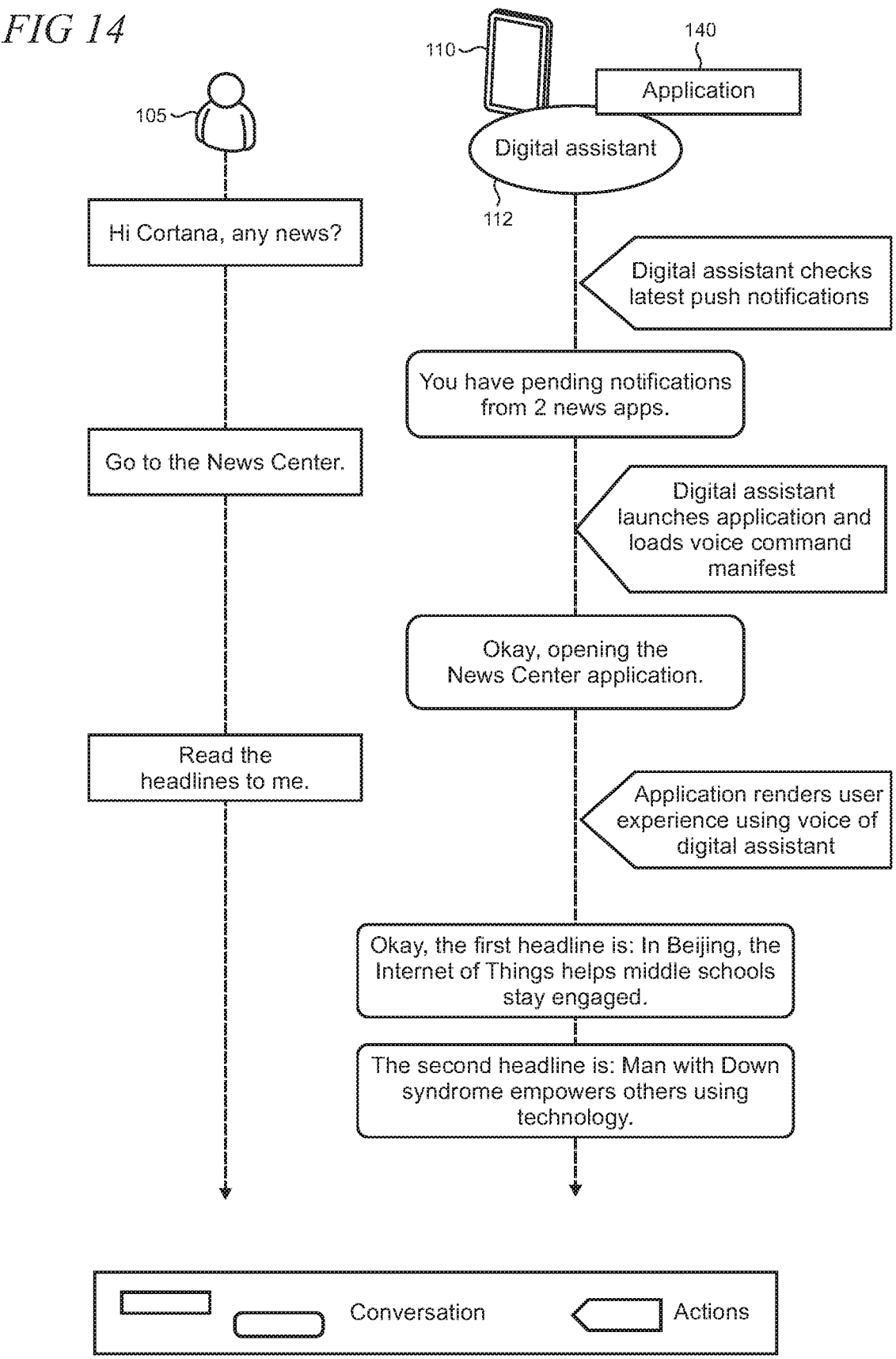
FIGS. 14 and 15 show illustrative unified digital assistant experience scenarios.
Figure 15:
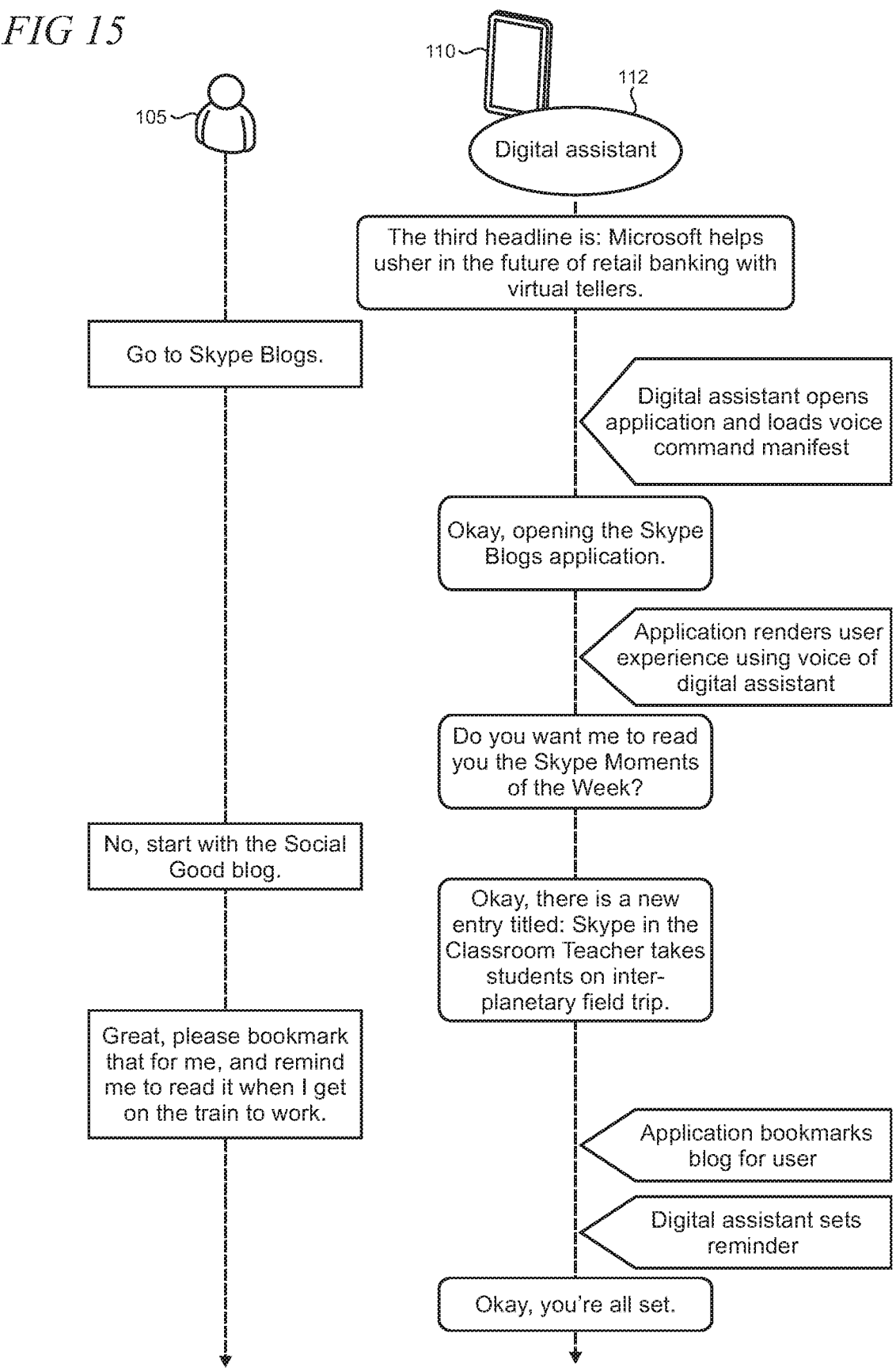

FIGS. 14 and 15 show illustrative unified digital assistant experience scenarios. In FIG. 14, the user 105 has interactions with the digital assistant 112 operating on device 110. When the user invokes the name of a particular application 140, named "News Center" in this example, the digital assistant opens the application and loads its voice command manifest. The digital assistant speaks to the user to confirm the actions it is taking.

When the application 140 is launched, it takes control of the digital assistant user experience and renders the experience using the voice of the digital assistant. This makes transition between the digital assistant and application domains appear seamless to the user. In this illustrative example, as shown, the user requests that the news headlines be read aloud and the application complies by parsing chunks of text and having them read aloud by the digital assistant. The application can utilize the services 1000 (FIG. 10) as may be needed to support the user experience with the application's particular context. In this illustrative example, the News Center application is a third party application, but similar features and user experiences can be implemented using first party applications as well.

In FIG. 15, the user invokes another application 140 by name, here "Skype Blogs." The digital assistant 112 launches that application and loads its voice command manifest. In some cases, multiple applications may be opened at the same time and the digital assistant extensibility client can map incoming voice inputs to the appropriate application according to the registered voice command from the manifests and available contextual data.

Figure 16:
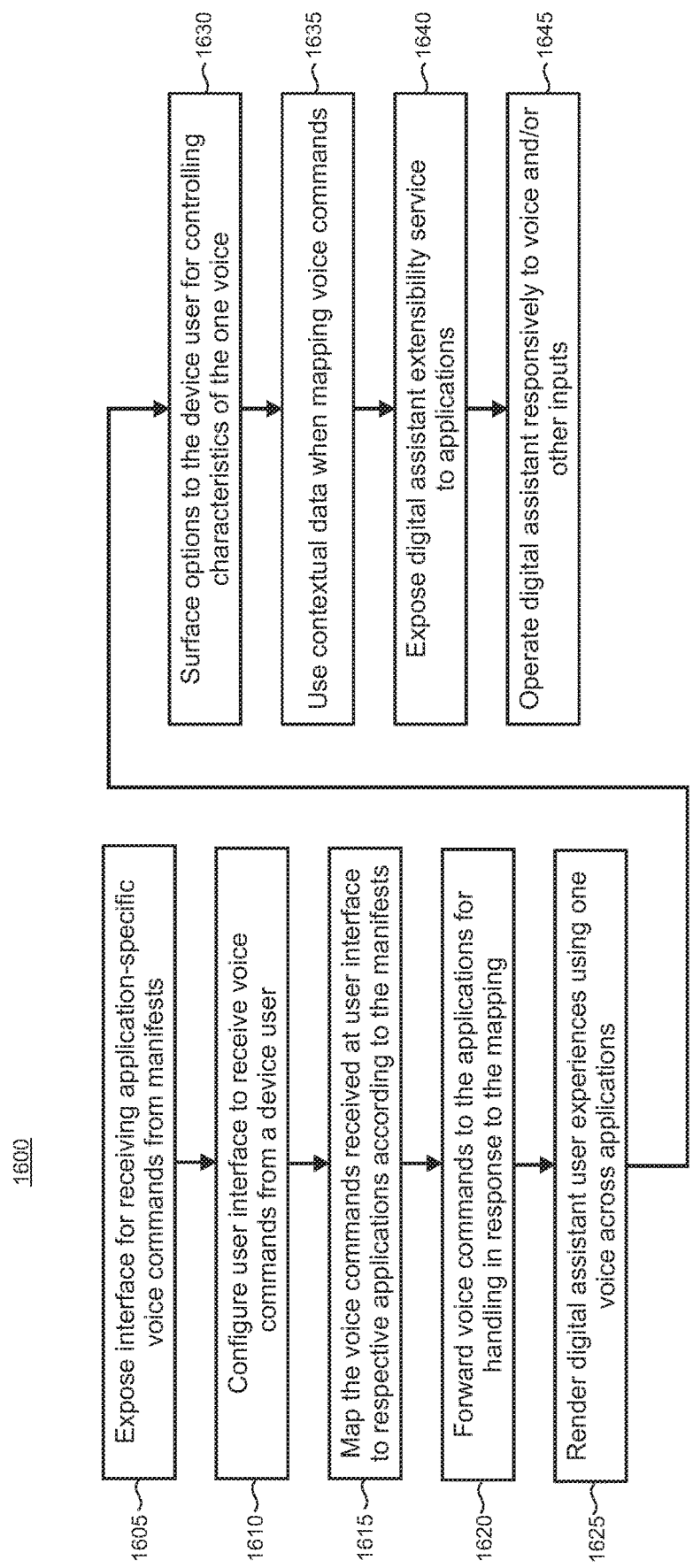
FIGS. 16, 17, and 18 show illustrative methods that may be performed when implementing the present digital assistant voice input integration.

FIG. 16 shows a flowchart of an illustrative method 1600 for operating a digital assistant on a device. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1605, an interface is exposed for receiving application-specific voice commands from manifests associated with respective applications installed on the device. A user interface is configured to receive voice commands from the device user in step 1610. In step 1615, the received voice commands are mapped to respective applications according to the manifests, and the mapped commands are forwarded for application handling in step 1620.

In step 1625, the digital assistant and/or applications can render user experiences on the device using one voice to smooth transitions and minimize disruptions as user focus switches among applications on the device. In step 1630, options can be surfaced to the user through a user interface for controlling characteristics of the one voice, such as language and voice preferences. Contextual data can also be used when performing the mapping in step 1635.

In step 1640, digital assistant extensibility services (such as services 1000 shown in FIG. 10 and described in the accompanying text) may be exposed to the applications. The digital assistant can be operated in its usual and normal fashion to supplement the integrated application experiences in step 1645.

Figure 17:
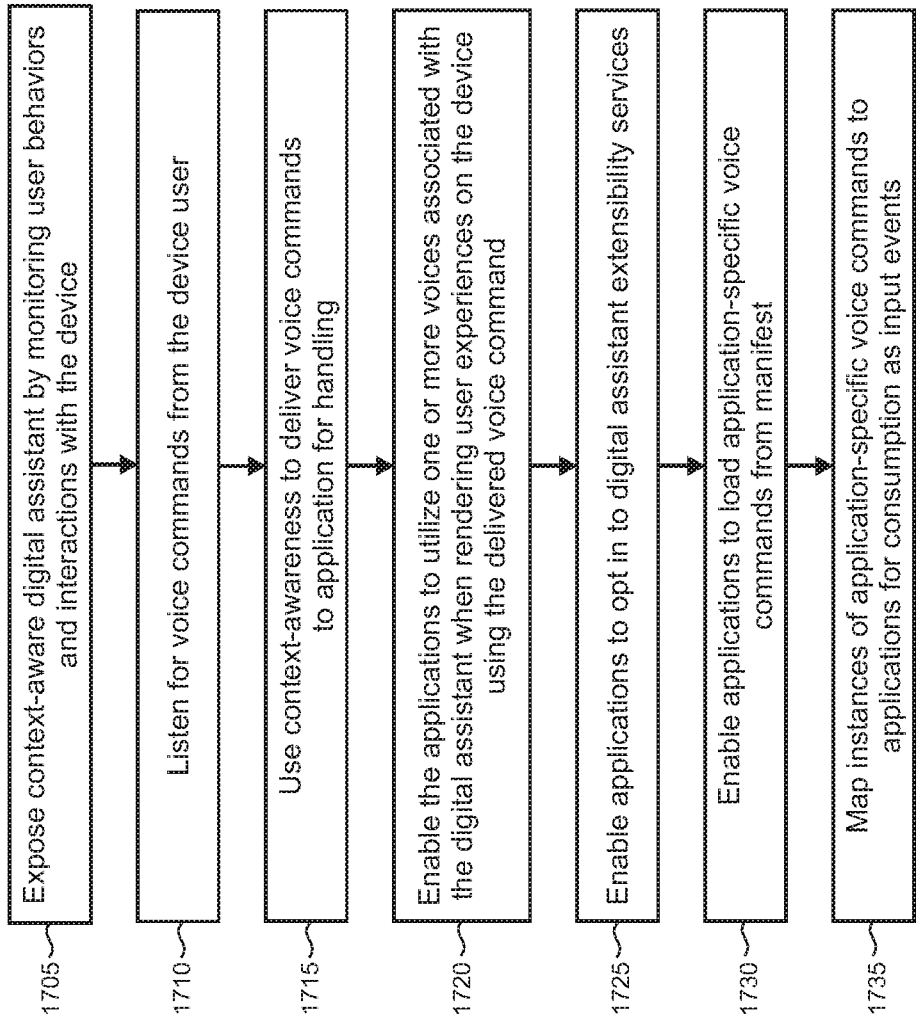

FIG. 17 is a flowchart of an illustrative method 1700 that may be implemented on a device (e.g., device 110). In step 1705, a context-aware digital assistant is exposed on the device in which context-awareness, at least in part, can be gained by monitoring user behaviors and interactions with the device (typically, with notice to the user and consent). In step 1710, voice commands from the user are listened for. In step 1715, the context-awareness is used to deliver voice commands to applications for handling. The applications can utilize one or more voices associated with the digital assistant when rendering user experiences on the device using the delivered voice command in step 1720.

In step 1725, applications can opt in to digital assistant extensibility services. The applications can also load application-specific voice commands from their manifests that may be used to customize user experiences to the application's domain in step 1730. In step 1735, application-specific voice commands can be mapped to particular applications for consumption as input events.

Figure 18:
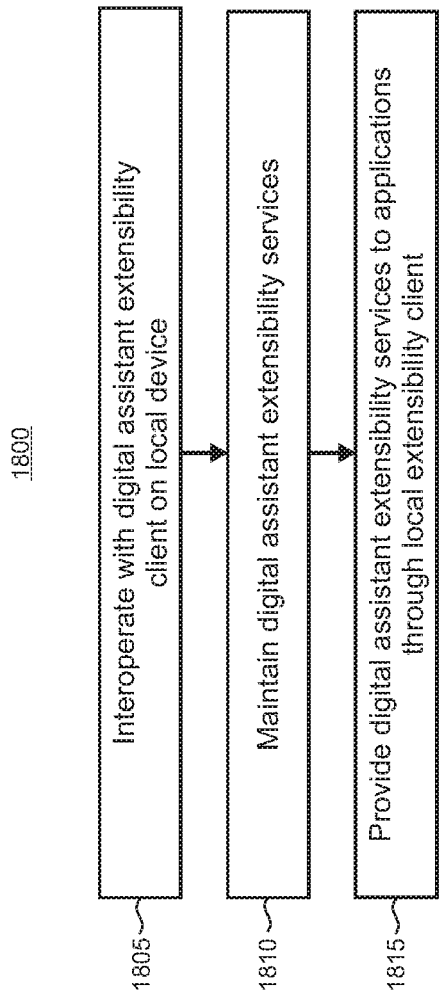

FIG. 18 shows an illustrative method 1800 that may be utilized by a service provider. In step 1805, one or more servers at the provider can interoperate with a digital assistant extensibility client running on a local device. In step 1810, digital assistant extensibility services are maintained which are provided to the applications through the local extensibility client in step 1815.

Figure 19:
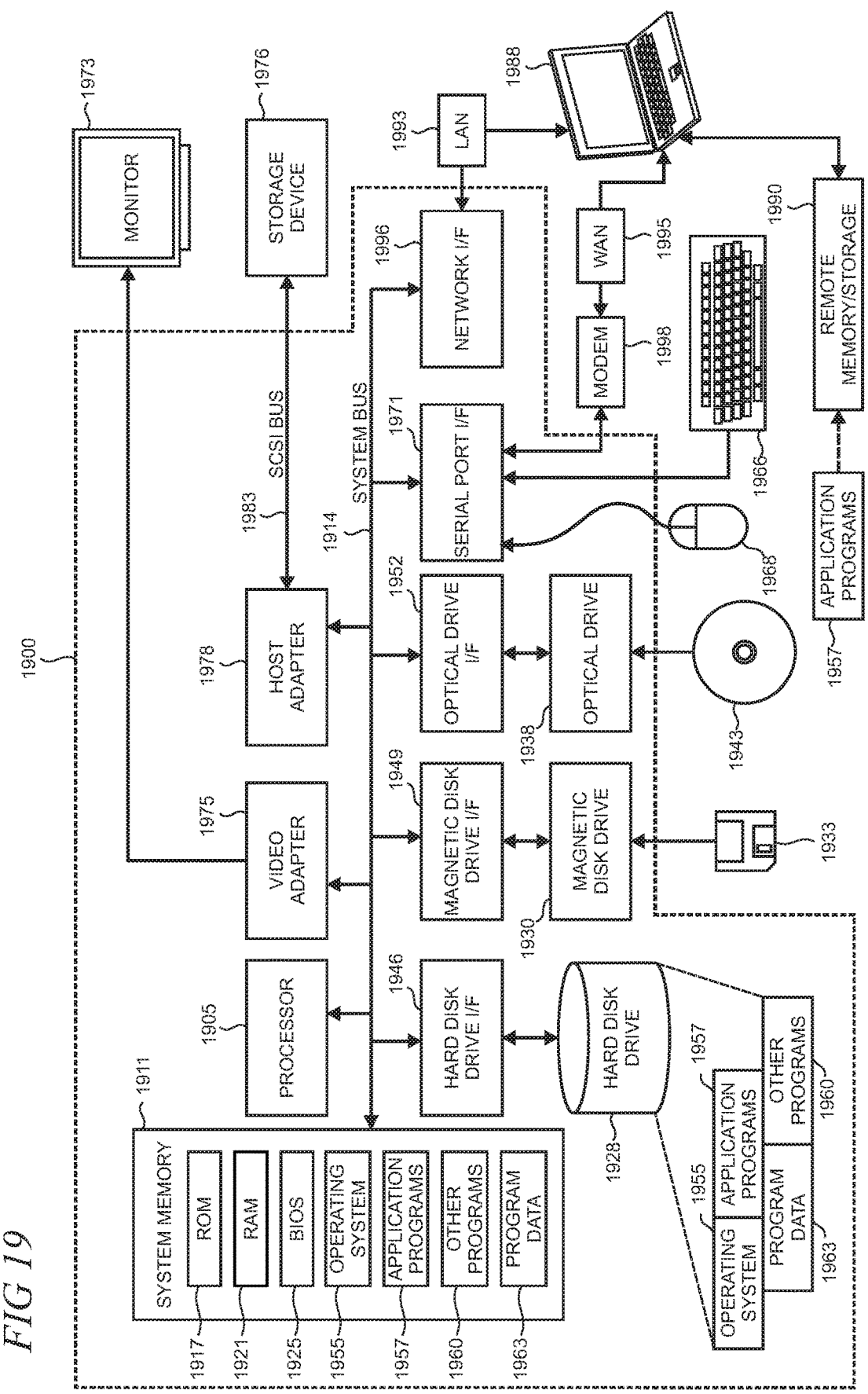
FIG. 19 is a simplified block diagram of an illustrative computer system such as a personal computer (PC) that may be used in part to implement the present digital assistant voice input integration.

FIG. 19 is a simplified block diagram of an illustrative computer system 1900 such as a PC, client machine, or server with which the present digital assistant voice input integration may be implemented. Computer system 1900 includes a processor 1905, a system memory 1911, and a system bus 1914 that couples various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computer system 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present digital assistant. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1933, optical disk 1943, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, personal computers typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computer system 1900 is operable in a networked environment using logical connections to one or more remote computers, such as a remote computer 1988. The remote computer 1988 may be selected as another personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of the present digital assistant voice input integration.

Figure 20:
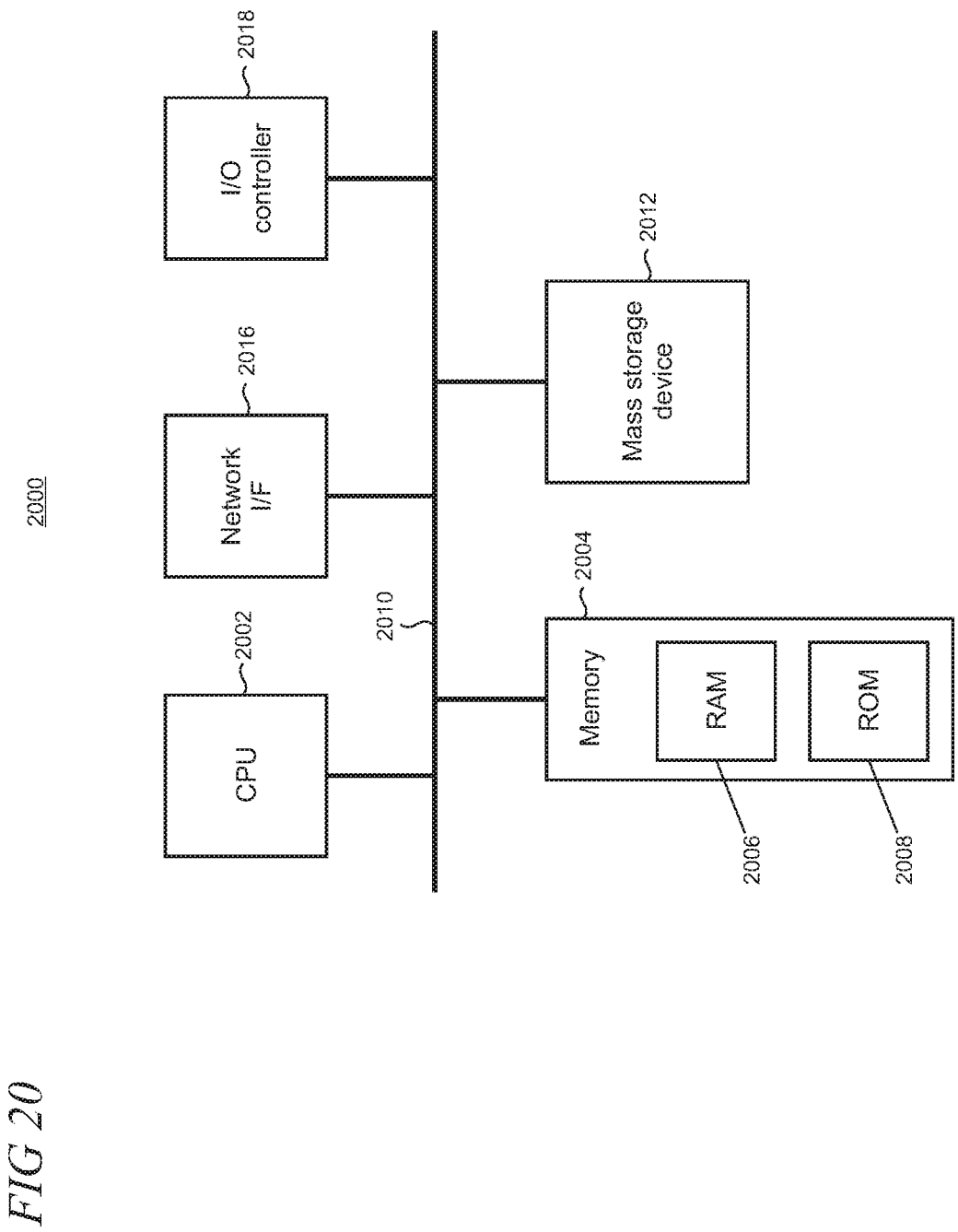
FIG. 20 shows a block diagram of an illustrative device that may be used in part to implement the present digital assistant voice input integration.

FIG. 20 shows an illustrative architecture 2000 for a device capable of executing the various components described herein for providing the present digital assistant voice input integration. Thus, the architecture 2000 illustrated in FIG. 20 shows an architecture that may be adapted for a server computer, mobile phone, a PDA, a smartphone, a desktop computer, a netbook computer, a tablet computer, GPS device, gaming console, and/or a laptop computer. The architecture 2000 may be utilized to execute any aspect of the components presented herein.

The architecture 2000 illustrated in FIG. 20 includes a CPU (Central Processing Unit) 2002, a system memory 2004, including a RAM 2006 and a ROM 2008, and a system bus 2010 that couples the memory 2004 to the CPU 2002. A basic input/output system containing the basic routines that help to transfer information between elements within the architecture 2000, such as during startup, is stored in the ROM 2008. The architecture 2000 further includes a mass storage device 2012 for storing software code or other computer-executed code that is utilized to implement applications, the file system, and the operating system.

The mass storage device 2012 is connected to the CPU 2002 through a mass storage controller (not shown) connected to the bus 2010. The mass storage device 2012 and its associated computer-readable storage media provide nonvolatile storage for the architecture 2000.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It should be appreciated that the network interface unit 2016 also may be utilized to connect to other types of networks and remote computer systems. The architecture 2000 also may include an input/output controller 2018 for receiving and processing input from a number of other devices, including a keyboard, mouse, or electronic stylus (not shown in FIG. 20). Similarly, the input/output controller 2018 may provide output to a display screen, a printer, or other type of output device (also not shown in FIG. 20).

It should be appreciated that the software components described herein may, when loaded into the CPU 2002 and executed, transform the CPU 2002 and the overall architecture 2000 from a general-purpose computing system into a special-purpose computing system customized to facilitate the functionality presented herein. The CPU 2002 may be constructed from any number of transistors or other discrete circuit elements, which may individually or collectively assume any number of states. More specifically, the CPU 2002 may operate as a finite-state machine, in response to executable instructions contained within the software modules disclosed herein. These computer-executable instructions may transform the CPU 2002 by specifying how the CPU 2002 transitions between states, thereby transforming the transistors or other discrete hardware elements constituting the CPU 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2000 in order to store and execute the software components presented herein. It also should be appreciated that the architecture 2000 may include other types of computing devices, including handheld computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Figure 21:
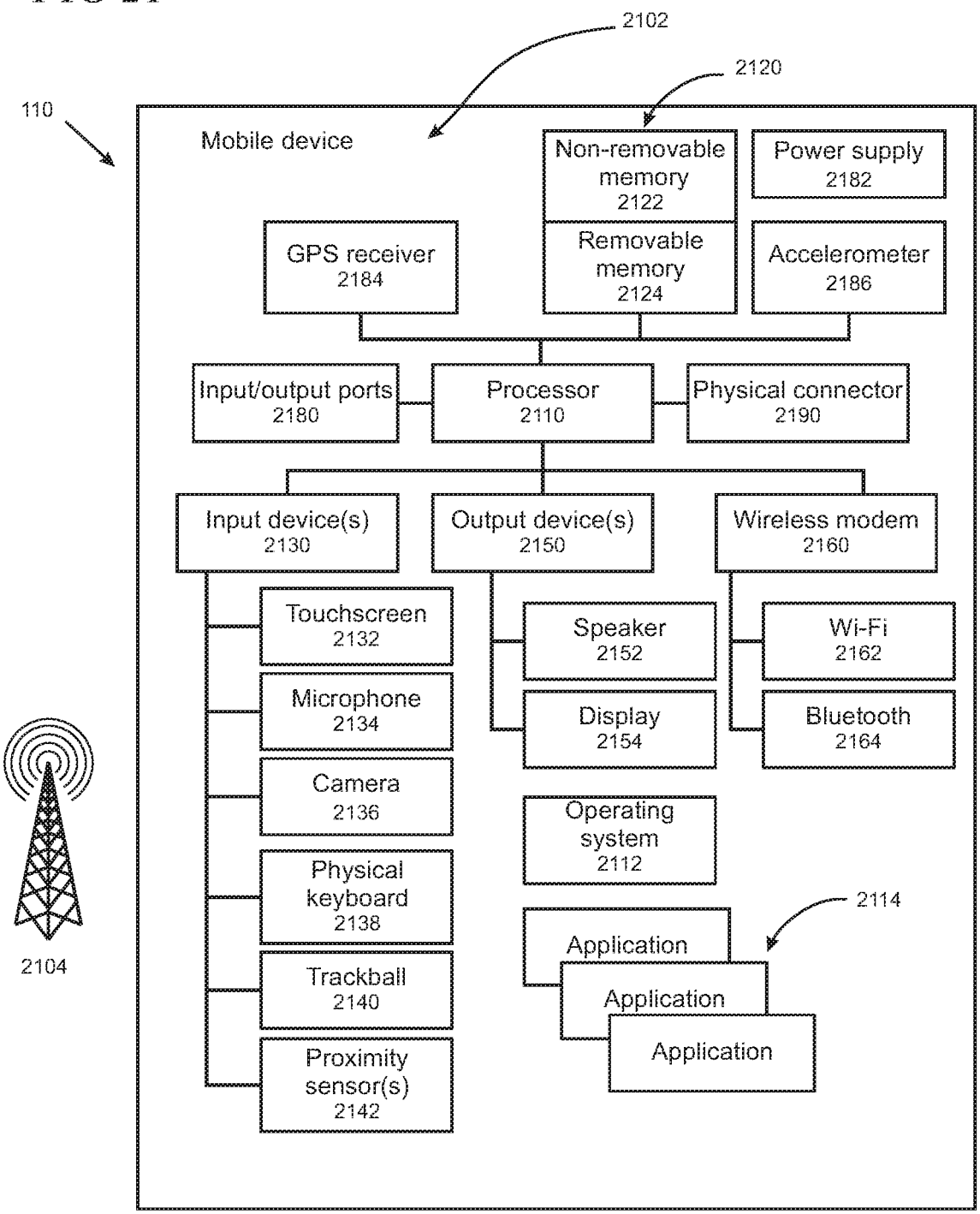
FIG. 21 is a block diagram of an illustrative mobile device.

FIG. 21 is a functional block diagram of an illustrative device 110 such as a mobile phone or smartphone including a variety of optional hardware and software components, shown generally at 2102. Any component 2102 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2104, such as a cellular or satellite network.

The illustrated device 110 can include a controller or processor 2110 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2112 can control the allocation and usage of the components 2102, including power states, above-lock states, and below-lock states, and provides support for one or more application programs 2114. The application programs can include common mobile computing applications (e.g., image-capture applications, email applications, calendars, contact managers, web browsers, messaging applications), or any other computing application.

The illustrated device 110 can include memory 2120. Memory 2120 can include non-removable memory 2122 and/or removable memory 2124. The non-removable memory 2122 can include RAM, ROM, Flash memory, a hard disk, or other well-known memory storage technologies. The removable memory 2124 can include Flash memory or a Subscriber Identity Module (SIM) card, which is well known in GSM (Global System for Mobile communications) systems, or other well-known memory storage technologies, such as "smart cards." The memory 2120 can be used for storing data and/or code for running the operating system 2112 and the application programs 2114. Example data can include web pages, text, images, sound files, video data, or other data sets to be sent to and/or received from one or more network servers or other devices via one or more wired or wireless networks.

The memory 2120 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 2130; such as a touch screen 2132; microphone 2134 for implementation of voice input for voice recognition, voice commands and the like; camera 2136; physical keyboard 2138; trackball 2140; and/or proximity sensor 2142; and one or more output devices 2150, such as a speaker 2152 and one or more displays 2154. Other input devices (not shown) using gesture recognition may also be utilized in some cases. Other possible output devices (not shown) can include piezoelectric or haptic output devices. Some devices can serve more than one input/output function. For example, touchscreen 2132 and display 2154 can be combined into a single input/output device.

A wireless modem 2160 can be coupled to an antenna (not shown) and can support two-way communications between the processor 2110 and external devices, as is well understood in the art. The modem 2160 is shown generically and can include a cellular modem for communicating with the mobile communication network 2104 and/or other radio-based modems (e.g., Bluetooth 2164 or Wi-Fi 2162). The wireless modem 2160 is typically configured for communication with one or more cellular networks, such as a GSM network for data and voice communications within a single cellular network, between cellular networks, or between the device and a public switched telephone network (PSTN).

The device can further include at least one input/output port 2180, a power supply 2182, a satellite navigation system receiver 2184, such as a GPS receiver, an accelerometer 2186, a gyroscope (not shown), and/or a physical connector 2190, which can be a USB port, IEEE 1394 (FireWire) port, and/or an RS-232 port. The illustrated components 2102 are not required or all-inclusive, as any components can be deleted and other components can be added.

Figure 22:
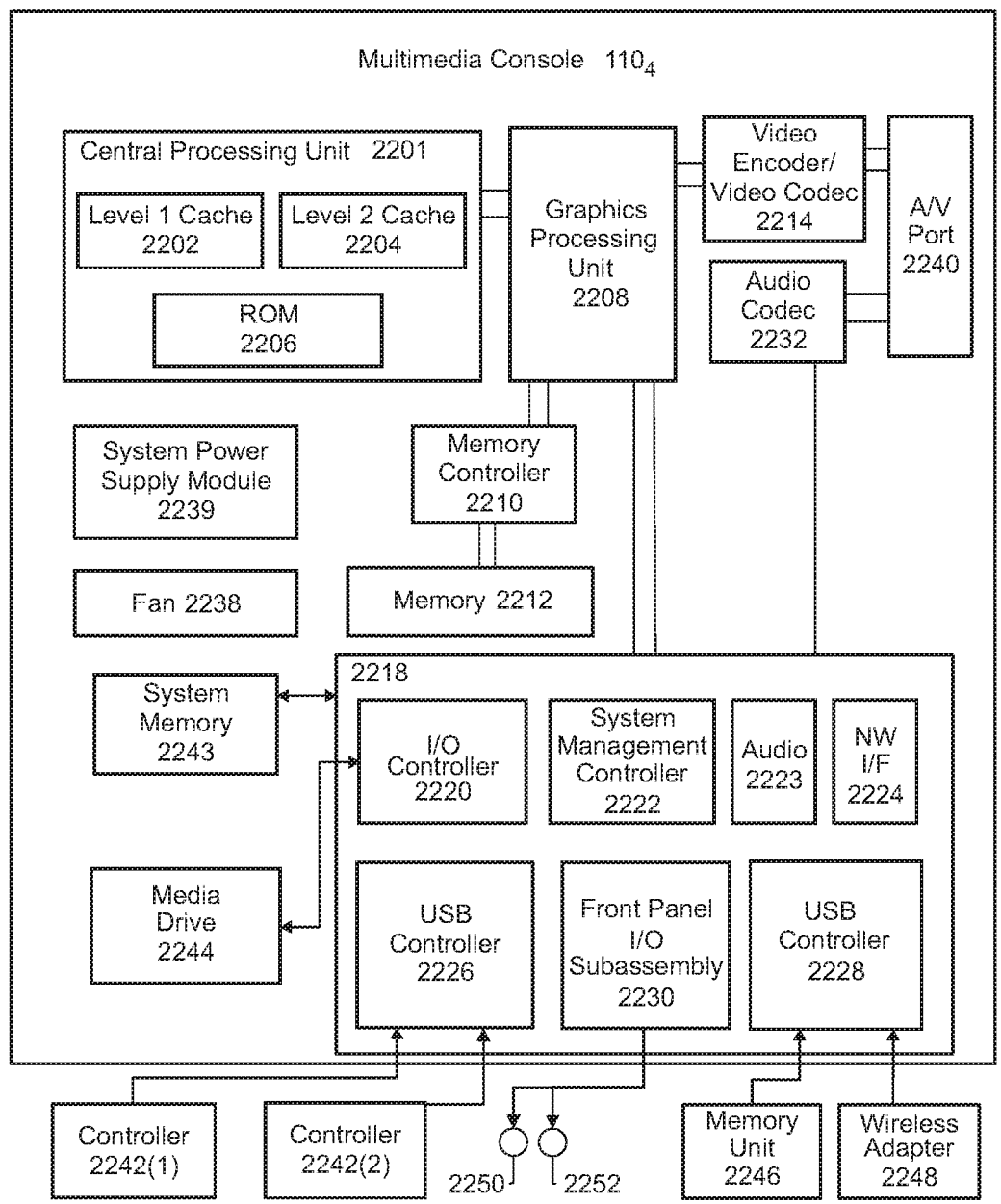
FIG. 22 is a block diagram of an illustrative multimedia console.

FIG. 22 is an illustrative functional block diagram of a multimedia console $110_4$. The multimedia console $110_4$ has a central processing unit (CPU) 2201 having a level 1 cache 2202, a level 2 cache 2204, and a Flash ROM (Read Only Memory) 2206. The level 1 cache 2202 and the level 2 cache 2204 temporarily store data and hence reduce the number of memory access cycles, thereby improving processing speed and throughput. The CPU 2201 may be configured with more than one core, and thus, additional level 1 and level 2 caches 2202 and 2204. The Flash ROM 2206 may store executable code that is loaded during an initial phase of a boot process when the multimedia console $110_4$ is powered ON.

A graphics processing unit (GPU) 2208 and a video encoder/video codec (coder/decoder) 2214 form a video processing pipeline for high speed and high resolution graphics processing. Data is carried from the GPU 2208 to the video encoder/video codec 2214 via a bus. The video processing pipeline outputs data to an A/V (audio/video) port 2240 for transmission to a television or other display. A memory controller 2210 is connected to the GPU 2208 to facilitate processor access to various types of memory 2212, such as, but not limited to, a RAM.

The multimedia console $110_4$ includes an I/O controller 2220, a system management controller 2222, an audio processing unit 2223, a network interface controller 2224, a first USB (Universal Serial Bus) host controller 2226, a second USB controller 2228, and a front panel I/O subassembly 2230 that are preferably implemented on a module 2218. The USB controllers 2226 and 2228 serve as hosts for peripheral controllers 2242(1) and 2242(2), a wireless adapter 2248, and an external memory device 2246 (e.g., Flash memory, external CD/DVD ROM drive, removable media, etc.). The network interface controller 2224 and/or wireless adapter 2248 provide access to a network (e.g., the Internet, home network, etc.) and may be any of a wide variety of various wired or wireless adapter components including an Ethernet card, a modem, a Bluetooth module, a cable modem, or the like.

System memory 2243 is provided to store application data that is loaded during the boot process. A media drive 2244 is provided and may comprise a DVD/CD drive, hard drive, or other removable media drive, etc. The media drive 2244 may be internal or external to the multimedia console $110_4$. Application data may be accessed via the media drive 2244 for execution, playback, etc. by the multimedia console $110_4$. The media drive 2244 is connected to the I/O controller 2220 via a bus, such as a Serial ATA bus or other high speed connection (e.g., IEEE 1394).

The system management controller 2222 provides a variety of service functions related to assuring availability of the multimedia console $110_4$. The audio processing unit 2223 and an audio codec 2232 form a corresponding audio processing pipeline with high fidelity and stereo processing. Audio data is carried between the audio processing unit 2223 and the audio codec 2232 via a communication link. The audio processing pipeline outputs data to the AN port 2240 for reproduction by an external audio player or device having audio capabilities.

The front panel I/O subassembly 2230 supports the functionality of the power button 2250 and the eject button 2252, as well as any LEDs (light emitting diodes) or other indicators exposed on the outer surface of the multimedia console $110_4$. A system power supply module 2239 provides power to the components of the multimedia console $110_4$. A fan 2238 cools the circuitry within the multimedia console $110_4$.

The CPU 2201, GPU 2208, memory controller 2210, and various other components within the multimedia console $110_4$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 2243 into memory 2212 and/or caches 2202 and 2204 and executed on the CPU 2201. The application may present a graphical user interface that provides a consistent user experience when navigating to different media types available on the multimedia console $110_4$. In operation, applications and/or other media contained within the media drive 2244 may be launched or played from the media drive 2244 to provide additional functionalities to the multimedia console $110_4$.

The multimedia console $110_4$ may be operated as a standalone system by simply connecting the system to a television or other display. In this standalone mode, the multimedia console $110_4$ allows one or more users to interact with the system, watch movies, or listen to music. However, with the integration of broadband connectivity made available through the network interface controller 2224 or the wireless adapter 2248, the multimedia console $110_4$ may further be operated as a participant in a larger network community.

When the multimedia console $110_4$ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console $110_4$ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2201 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2242(1) and 2242(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present digital assistant voice input integration are now presented by way of illustration and not as an exhaustive list of all embodiments. An example includes a method for implementing extensibility of a digital assistant operating on a device to one or more applications, comprising: exposing an interface for receiving application-specific voice commands from manifests associated with respective ones of the applications; configuring a user interface to receive voice commands from a device user; mapping the voice commands received at the user interface to respective ones of the applications according to the manifests; and forwarding the voice commands to the applications for handling in response to the mapping.

In another example, the method further includes rendering user experiences supported by the applications using a voice associated with the digital assistant so that user experiences across the applications utilize one voice. In another example, the method further includes surfacing options to the device user for controlling characteristics of the one voice, the characteristics including one of language, gender associated with the one voice, or accent associated with the one voice. In another example, the method further includes using contextual data when performing the voice command mapping. In another example, the contextual data comprises one or more of time/date, location of the user or device, language, schedule, applications installed on the device, user preferences, user behaviors, user activities, stored contacts, call history, messaging history, browsing history, device type, device capabilities, or communication network type. In another example, the method further includes providing services to the applications, the services including one or more of language services, vocabulary services, voice services, or synthesized text to speech services. In another example, the voice services are arranged to enable the applications to switch among different voices when rendering the user experiences. In another example, the method further includes including receiving portions of the services from a remote service provider. In another example, the method further includes supporting the interface with an extensibility client that is configured for interaction with the remote service provider. In another example, the method further includes configuring the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource.

A further example includes a device, comprising: one or more processors; a user interface (UI) for interacting with a user of the device using graphics and audio; and a memory device storing code associated with one or more applications and computer-readable instructions which, when executed by the one or more processors, perform a method comprising the steps of: exposing a digital assistant on the device for maintaining context-awareness for a device user by monitoring user behaviors and interactions with the device, the digital assistant further interacting with the device user using voice interactions through the UI, listening for voice commands from the device user, using the context-awareness to deliver a voice command to an application for handling, and enabling the one or more applications to utilize one or more voices associated with the digital assistant when rendering user experiences on the device using the delivered voice command.

In another example, the device further includes enabling the one or more applications to opt in to digital assistant extensibility services surfaced by a local client operating on the device. In another example, the device further includes enabling the one or more applications to load application-specific voice commands from a manifest into a runtime environment for execution. In another example, the manifest is populated using declarative markup. In another example, the device further includes mapping instances of the application-specific voice commands to the applications for consumption as input events. In another example, the application parses one or more chunks of text for the digital assistant to read aloud using the digital assistant's native voice.

A further example includes one or more computer-readable memory devices storing instructions which, when executed by one or more processors disposed in a computer server, perform a method comprising the steps of: interoperating with a digital assistant extensibility client on a local device, the digital assistant extensibility client exposing an application programming interface (API) to one or more applications being executable on the device; maintaining digital assistant extensibility services including at least one of i) language services that enable applications to use one or more different languages when rendering a user experience on the local device, ii) vocabulary services that enable applications to handle unknown words or phrases when rendering the user experience, iii) voice services that enable applications to use one or more different voices when rendering the user experience, or iv) synthesized text to speech services that enable applications to use a synthesized voice that mimics a human speaker; and providing the digital assistant extensibility services to the one or more applications through the API exposed by the digital assistant extensibility client on the local device.

In another example, the digital assistant extensibility services and digital assistant extensibility client provide a platform with user experiences that are renderable on the local device using one voice across all the applications, the one voice being natively associated with a digital assistant that is executable on the local device. In another example, the applications have application-specific voice commands written to a manifest which is loaded into a runtime environment upon application launch. In another example, the digital assistant extensibility client maps voice commands from the device user to the application-specific voice commands loaded from the manifest.

Based on the foregoing, it should be appreciated that technologies for a digital assistant have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. One or more computer-readable memory devices storing instructions which, when executed by one or more processors disposed in a computer server, perform a method comprising the steps of:

interoperating with a digital assistant extensibility client on a local device having a digital assistant that is configured for maintaining context-awareness of local device state by monitoring user behaviors and interactions with the local device, the digital assistant extensibility client being instantiated in an operating system of the local device and configured for exposing an application programming interface (API) to one or more applications being executable on the local device and being further configured to register commands of the one or more applications in the operating system, in which the one or more applications interoperate with the digital assistant through the registered commands in the operating system;

maintaining digital assistant extensibility services at the computer server which is remotely instantiated from the local device and in communication with the local device over a communications network, the digital assistant extensibility services including at least one of i) language services that enable applications to use one or more different languages when rendering a user experience on the local device, ii) vocabulary services that enable applications to handle unknown words or phrases when rendering the user experience, iii) voice services that enable applications to use one or more different voices when rendering the user experience, or iv) synthesized text to speech services that enable applications to use a synthesized voice that mimics a human speaker;

at installation of the one or more applications, receiving a request from the one or more applications that describes interactions with the digital assistant extensibility services;

at runtime of the one or more applications, registering a manifest of commands from the one or more applications with the digital assistant, in which respective manifests of commands are application-specific with respective ones of the one or more applications; and providing the digital assistant extensibility services over the communications network to the one or more applications through the API exposed by the digital assistant extensibility client on the local device in response to the request from the one or more applications and registered manifest of commands, and further in response to the context-awareness, wherein the one or more applications utilize one or more of the digital assistant extensibility services provided over the communications network to provide the user experience at the local device using the digital assistant.

2. The one or more computer-readable memory devices of claim 1 in which the digital assistant extensibility services and digital assistant extensibility client provide a platform with user experiences that are renderable on the local device using one voice across all the applications, the one voice being natively associated with a digital assistant that is executable on the local device.

3. The one or more computer-readable memory devices of claim 1 in which the applications have application-specific voice commands written to a manifest which is loaded into a runtime environment upon application launch.

4. The one or more computer-readable memory devices of claim 3 in which the digital assistant extensibility client maps voice commands from a local device user to the application-specific voice commands loaded from the manifest.

5. A method performed at a computer server, comprising the steps of:
interoperating with a digital assistant extensibility client on a local device having a digital assistant that is configured for maintaining context-awareness of local device state by monitoring user behaviors and interactions with the local device, the digital assistant extensibility client being instantiated in an operating system of the local device and configured for exposing an application programming interface (API) to one or more applications being executable on the local device and being further configured to register commands of the one or more applications in the operating system, in which the one or more applications interoperate with the digital assistant through the registered commands in the operating system;

maintaining digital assistant extensibility services at the computer server which is remotely instantiated from the local device and in communication with the local device over a communications network, the digital assistant extensibility services including at least one of i) language services that enable applications to use one or more different languages when rendering a user experience on the local device, ii) vocabulary services that enable applications to handle unknown words or phrases when rendering the user experience, iii) voice services that enable applications to use one or more different voices when rendering the user experience, or iv) synthesized text to speech services that enable applications to use a synthesized voice that mimics a human speaker;

at installation of the one or more applications, receiving a request from the one or more applications that describes interactions with the digital assistant extensibility services;

at runtime of the one or more applications, registering a manifest of commands from the one or more applications with the digital assistant, in which respective manifests of commands are application-specific with respective ones of the one or more applications; and providing the digital assistant extensibility services over the communications network to the one or more applications through the API exposed by the digital assistant extensibility client on the local device in response to the request from the one or more applications and registered manifest of commands, and further in response to the context-awareness, wherein the one or more applications utilize one or more of the digital assistant extensibility services provided over the communications network to provide the user experience at the local device using the digital assistant.

6. The method of claim 5 in which the digital assistant extensibility services and digital assistant extensibility client provide a platform with user experiences that are renderable on the local device using one voice across all the applications, the one voice being natively associated with a digital assistant that is executable on the local device.

7. The method of claim 5 in which the applications have application-specific voice commands written to a manifest which is loaded into a runtime environment upon application launch.

8. The method of claim 7 in which the digital assistant extensibility client maps voice commands from a local device user to the application-specific voice commands loaded from the manifest.

9. A computer server, comprising:
one or more processors;
a memory device storing computer-readable instructions which, when executed by the one or more processors, cause the computer server to
interoperate with a digital assistant extensibility client on a local device having a digital assistant that is configured for maintaining context-awareness of local device state by monitoring user behaviors and interactions with the local device, the digital assistant extensibility client being instantiated in an operating system of the local device and configured for exposing an application programming interface (API) to one or more applications being executable on the local device and being further configured to register commands of the one or more applications in the operating system, in which the one or more applications interoperate with the digital assistant through the registered commands in the operating system;

maintain digital assistant extensibility services at the computer server which is remotely instantiated from the local device and in communication with the local device over a communications network, the digital assistant extensibility services including at least one of i) language services that enable applications to use one or more different languages when rendering a user experience on the local device, ii) vocabulary services that enable applications to handle unknown words or phrases when rendering the user experience, iii) voice services that enable applications to use one or more different voices when rendering the user experience, or iv) synthesized text to speech services that enable applications to use a synthesized voice that mimics a human speaker;

at installation of the one or more applications, receive a request from the one or more applications that describes interactions with the digital assistant extensibility services;

at runtime of the one or more applications, register a manifest of commands from the one or more applications with the digital assistant, in which respective manifests of commands are application-specific with respective ones of the one or more applications; and provide the digital assistant extensibility services over the communications network to the one or more applications through the API exposed by the digital assistant extensibility client on the local device in response to the request from the one or more applications and registered manifest of commands, and further in response to the context-awareness, wherein the one or more applications utilize one or more of the digital assistant extensibility services provided over the communications network to provide the user experience at the local device using the digital assistant.

10. The computer server of claim 9 in which the digital assistant extensibility services and digital assistant extensibility client provide a platform with user experiences that are renderable on the local device using one voice across all the applications, the one voice being natively associated with a digital assistant that is executable on the local device.

11. The computer server of claim 9 in which the applications have application-specific voice commands written to a manifest which is loaded into a runtime environment upon application launch.

12. The computer server of claim 11 in which the digital assistant extensibility client maps voice commands from a local device user to the application-specific voice commands loaded from the manifest.

* * * * *